(12) United States Patent
Mukund et al.

(10) Patent No.: US 11,494,651 B2
(45) Date of Patent: Nov. 8, 2022

(54) SYSTEMS AND METHODS FOR OPTIMIZING REFINERY COKER PROCESS

(71) Applicant: Imubit Israel LTD, Modiin (IL)

(72) Inventors: Abishek Mukund, Houston, TX (US); Matthew Stephens, Houston, TX (US); Nadav Cohen, Yavne (IL)

(73) Assignee: Imubit Israel LTD, Modiin (IL)

(*) Notice: Subject to any disclaimer, the term of this patent is extended or adjusted under 35 U.S.C. 154(b) by 245 days.

(21) Appl. No.: 16/888,128

(22) Filed: May 29, 2020

(65) Prior Publication Data

US 2020/0311547 A1    Oct. 1, 2020

Related U.S. Application Data

(63) Continuation-in-part of application No. 15/883,114, filed on Jan. 30, 2018, now Pat. No. 11,200,489.

(51) Int. Cl.
*G06N 3/08* (2006.01)
*C10B 41/04* (2006.01)
*G06K 9/62* (2022.01)

(52) U.S. Cl.
CPC .............. *G06N 3/08* (2013.01); *C10B 41/04* (2013.01); *G06K 9/6256* (2013.01); *G06K 9/6262* (2013.01)

(58) Field of Classification Search
CPC ........ G06N 3/08; C10B 41/04; G06K 9/6256; G06K 9/6262
USPC .......................................................... 706/25
See application file for complete search history.

(56) References Cited

U.S. PATENT DOCUMENTS

| | | | |
|---|---|---|---|
| 4,374,021 | A | 2/1983 | Bartholic |
| 5,311,421 | A | 5/1994 | Nomura et al. |
| 5,825,646 | A | 10/1998 | Keeler et al. |
| 7,720,641 | B2 | 5/2010 | Alagappan et al. |
| 9,690,312 | B2 | 6/2017 | Steven et al. |
| 2002/0059202 | A1 | 5/2002 | Hadzikadic et al. |
| 2003/0108244 | A1 | 6/2003 | Li et al. |
| 2007/0156288 | A1 | 7/2007 | Wroblewski et al. |

(Continued)

FOREIGN PATENT DOCUMENTS

WO    WO-2021/025841 A1    2/2021

OTHER PUBLICATIONS

International Search Report and Written Opinion on PCT/IB2021/057421 dated Nov. 4, 2021.

(Continued)

*Primary Examiner* — Allen C Wong
(74) *Attorney, Agent, or Firm* — Foley & Lardner LLP

(57) ABSTRACT

A control system for automatic operation of a coker, the control system. The control system includes a drum feeder operable to modulate a feed of oil into a coke drum of the coker. The control system further includes a controller with a processing circuit. The processing circuit obtains a target coke rate indicating a target rate at which to accumulate coke within the coke drum. The processing circuit further uses a neural network model to generate a target coker feed rate predicted to result in the coke accumulating within the coke drum at the target coke rate. The target coker feed rate indicates a target rate at which to feed the oil into the coke drum. The processing circuit further operates the drum feeder using the target coker feed rate to modulate the feed of oil into the coke drum.

23 Claims, 18 Drawing Sheets

(56) References Cited

U.S. PATENT DOCUMENTS

| | | | |
|---|---|---|---|
| 2007/0168328 | A1 | 7/2007 | Peralta et al. |
| 2010/0050025 | A1 | 2/2010 | Grichnik et al. |
| 2012/0053762 | A1 | 3/2012 | Stiefenhofer et al. |
| 2015/0185717 | A1 | 7/2015 | Sayyar-Rodsari et al. |
| 2015/0379429 | A1 | 12/2015 | Lee et al. |
| 2016/0258361 | A1 | 9/2016 | Tiwari et al. |
| 2017/0061249 | A1* | 3/2017 | Estrada .................. G06T 5/005 |
| 2017/0139423 | A1 | 5/2017 | El Ferik et al. |
| 2017/0183573 | A1 | 6/2017 | Arora et al. |
| 2018/0016503 | A1* | 1/2018 | Prasad .................... C10B 55/02 |
| 2018/0275692 | A1* | 9/2018 | Lattanzio ................. G01K 3/14 |
| 2019/0236447 | A1 | 8/2019 | Cohen et al. |
| 2020/0074486 | A1 | 3/2020 | Motohashi et al. |
| 2020/0311547 | A1 | 10/2020 | Mukund et al. |
| 2021/0096518 | A1 | 4/2021 | Ilani et al. |
| 2021/0348066 | A1 | 11/2021 | Clark et al. |

OTHER PUBLICATIONS

International Search Report and Written Opinion issued in PCT/US2022/015474 dated May 12, 2022.

International Search Report and Written Opinion issued on PCT/US2021/030723 dated Jul. 28, 2021.

Lawrynczuk, "Predictive Control of a Distillation Column Using a Control-Oriented Neural Model," ICANNGA, 2011, part 1, pp. 230-239.

Lawrynczuk, "Neural Dynamic Matrix Control Algorithm with Disturbance Compensation," IEA/AIE, 2010, part 3, pp. 52-61.

Nguyen et al., "Multiple neural networks for a long term time series forecast", Neural Computing & Applic (2004) 13:90-98 (Year: 2004).

International Search Report and Written Opinion issued in PCT/US2022/024645 dated Jul. 1, 2022.

* cited by examiner

Neural Network Predicts Actual Coke Rate Resulting From Actual Coker Feed Rate and Real-Time System Conditions

SYSTEMS AND METHODS FOR OPTIMIZING REFINERY COKER PROCESS

CROSS-REFERENCE TO RELATED PATENT APPLICATION

This application is a continuation-in-part of U.S. patent application Ser. No. 15/883,114 filed Jan. 30, 2018.

BACKGROUND

The present application relates to optimizing oil refinery processes. More particularly, the present application relates to optimizing coke production in an oil refinery system using a neural network.

SUMMARY

One implementation of the present disclosure is a control system for automatic operation of a delayed coker. The control system includes a drum feeder operable to modulate a feed of oil into a coke drum of the delayed coker. The control system further includes a controller including a processing circuit. The processing circuit obtains a target coke rate indicating a target rate at which to accumulate coke within the coke drum. The processing circuit further uses a neural network model to generate a target coker feed rate predicted to result in the coke accumulating within the coke drum at the target coke rate, the target coker feed rate indicating a target rate at which to feed the oil into the coke drum. The processing circuit further operates the drum feeder using the target coker feed rate to modulate the feed of oil into the coke drum.

In some embodiments, the coker is a delayed coker and the feed of oil is residual oil, the delayed coker operable to heat the residual oil to its thermal cracking temperature.

In some embodiments, the processing circuit is configured to calculate the target coke rate by determining an amount of remaining space to be filled in the coke drum by comparing a drum outage target with a predicted drum outage, determining an amount of remaining time in a current drum cycle by comparing a cycle time target with an amount of time elapsed in the current drum cycle, and calculating the target coke rate required to fill the amount of remaining space to be filled in the coke drum in the amount of time remaining in the current drum cycle.

In some embodiments, using the neural network to generate the target coker feed rate includes obtaining values of a plurality of disturbance variables predicted to affect a rate at which the coke accumulates within the coke drum, the plurality of disturbance variables comprising one or more attributes of crude oil refined to produce the oil fed into the oil drum or measurements from oil refining equipment that operates to refine the crude oil. It further includes applying the values of the plurality of disturbance variables and the target coke rate as inputs to the neural network model and obtaining the target coker feed rate as an output of the neural network model.

In some embodiments, the processing circuit calculates a plurality of historical coke rates using historical data indicating rates at which the coke accumulated within the coke drum during a plurality of historical time periods. The processing circuit further associates the plurality of historical coke rates with historical values of a plurality of variables predicted to affect the historical coke rates and generates a set of training data comprising the historical coke rates and the historical values of the plurality of variables predicted to affect the historical coke rates. The processing circuit further trains the neural network model using the set of training data.

In some embodiments, the processing circuit obtains an actual coker feed rate indicating an actual rate at which the oil is fed into the coke drum and uses the neural network model to generate a predicted coke rate predicted to result from feeding the oil into the coke drum at the actual coker feed rate.

In some embodiments, the processing circuit calculates a coke rate bias by comparing the predicted coke rate with an actual coke rate indicating an actual rate at which the coke accumulates within the coke drum and applies the coke rate bias to another value of the predicted coke rate to generate an adjusted coke rate.

In some embodiments, the processing circuit generates a predicted drum outage based on a size of the coke drum and plurality of values of the predicted coke rate at a plurality of times since the coke began accumulating in the coke drum, the predicted drum outage indicating a predicted amount of available space in the coke drum.

In some embodiments, the processing circuit calculates an outage bias by comparing the predicted drum outage with an actual drum outage indicating an actual amount of space available within the coke drum and applies the outage bias to another value of the predicted drum outage to generate an adjusted value of the drum outage.

Another implementation of the present disclosure is a method for automatic operation of a delayed coker. The method includes obtaining a target coke rate indicating a target rate at which to accumulate coke within a coke drum of the delayed coker. The method includes using a neural network model to generate a target coker feed rate predicted to result in the coke accumulating within the coke drum at the target coke rate, the target coker feed rate indicating a target rate at which to feed oil into the coke drum. The method includes operating a drum feeder using the target coker feed rate to modulate a feed of oil into the coke drum.

In some embodiments, the coker is a delayed coker and the feed of oil is residual oil, the delayed coker operable to heat the residual oil to its thermal cracking temperature.

In some embodiments, calculating the target coke rate includes determining an amount of remaining space to be filled in the coke drum by comparing a drum outage target with a predicted drum outage, determining an amount of remaining time in a current drum cycle by comparing a cycle time target with an amount of time elapsed in the current drum cycle, and calculating the target coke rate required to fill the amount of remaining space to be filled in the coke drum in the amount of time remaining in the current drum cycle.

In some embodiments, using the neural network to generate the target coker feed rate includes obtaining values of a plurality of disturbance variables predicted to affect a rate at which the coke accumulates within the coke drum, the plurality of disturbance variables comprising one or more attributes of crude oil refined to produce the oil fed into the oil drum or measurements from oil refining equipment that operates to refine the crude oil. Using the neural network to generate the target coker feed rate further includes applying the values of the plurality of disturbance variables and the target coke rate as inputs to the neural network model and obtaining the target coker feed rate as an output of the neural network model.

In some embodiments, the method further includes calculating a plurality of historical coke rates using historical data indicating rates at which the coke accumulated within the coke drum during a plurality of historical time periods. The method further includes associating the plurality of historical coke rates with historical values of a plurality of variables predicted to affect the historical coke rates. The method further includes generating a set of training data comprising the historical coke rates and the historical values of the plurality of variables predicted to affect the historical coke rates. The method further includes training the neural network model using the set of training data.

In some embodiments, the method further includes obtaining an actual coker feed rate indicating an actual rate at which the oil is fed into the coke drum. The method further includes using the neural network model to generate a predicted coke rate predicted to result from feeding the oil into the coke drum at the actual coker feed rate.

In some embodiments, the method includes calculating a coke rate bias by comparing the predicted coke rate with an actual coke rate indicating an actual rate at which the coke accumulates within the coke drum. The method includes applying the coke rate bias to another value of the predicted coke rate to generate an adjusted coke rate.

In some embodiments, the method includes generating a predicted drum outage based on a size of the coke drum and plurality of values of the predicted coke rate at a plurality of times since the coke began accumulating in the coke drum, the predicted drum outage indicating a predicted amount of available space in the coke drum.

In some embodiments, the method includes calculating an outage bias by comparing the predicted drum outage with an actual drum outage indicating an actual amount of space available within the coke drum. The method includes applying the outage bias to another value of the predicted drum outage to generate an adjusted value of the drum outage.

Another implementation of the present disclosure is a control system for automatic operation of an oil refinery. The control system includes an oil feeder operable to modulate a feed of oil into a production unit of the oil refinery, the production unit operable to convert at least a portion of the oil into a derived oil product. The control system further includes a controller comprising a processing circuit. The processing circuit obtains a target production rate indicating a target rate at which to produce the derived oil product within the production unit. The processing circuit uses a neural network model to generate a target feed rate predicted to result in the derived oil product being produced within the production unit at the target production rate, the target feed rate indicating a target rate at which to feed the oil into the production unit. The processing circuit operates the oil feeder using the target feed rate to modulate the feed of oil into the production unit.

In some embodiments, using the neural network to generate the target feed rate includes obtaining values of a plurality of disturbance variables predicted to affect a rate at which the derived oil product is produced within the production unit, the plurality of disturbance variables comprising one or more attributes of crude oil refined to produce the oil fed into the production unit or measurements from oil refining equipment that operates to refine the crude oil. Using the neural network to generate the target feed rate further includes applying the values of the plurality of disturbance variables and the target production rate as inputs to the neural network model and obtaining the target feed rate as an output of the neural network model.

In some embodiments, the processing circuit calculates a plurality of historical production rates using historical data indicating rates at which the derived oil product was produced during a plurality of historical time periods. The processing circuit associates the plurality of historical production rates with historical values of a plurality of variables predicted to affect the historical production rates. The processing circuit generates a set of training data comprising the historical production rates and the historical values of the plurality of variables predicted to affect the historical production rates. The processing circuit trains the neural network model using the set of training data.

In some embodiments, the processing circuit obtains an actual feed rate indicating an actual rate at which the oil is fed into the production unit. The processing circuit uses the neural network model to generate a predicted production rate predicted to result from feeding the oil into the production unit at the actual feed rate.

DETAILED DESCRIPTION

Overview

Referring generally to the FIGURES, systems and methods optimizing coke production in an oil refinery process are shown, according to exemplary embodiments. In some embodiments, the systems and methods disclosed herein determine a rate for the amount of coke being generated (e.g., a coke rate) within a coke drum and use a trained neural network to determine a rate at which to feed the coke drum (e.g., a target feed rate) that will cause the coke to be generated at the determined coke rate. In some embodiments, the neural network can generate a target coke rate that will optimize coke production and remain feasible based on constraints from the feeder, user preferences, and system operations. The neural network can be trained using hundreds or thousands of previously performed drum cycle batches and their respective historical coke rates.

Oil Refinery Process Overview

Figure 1:
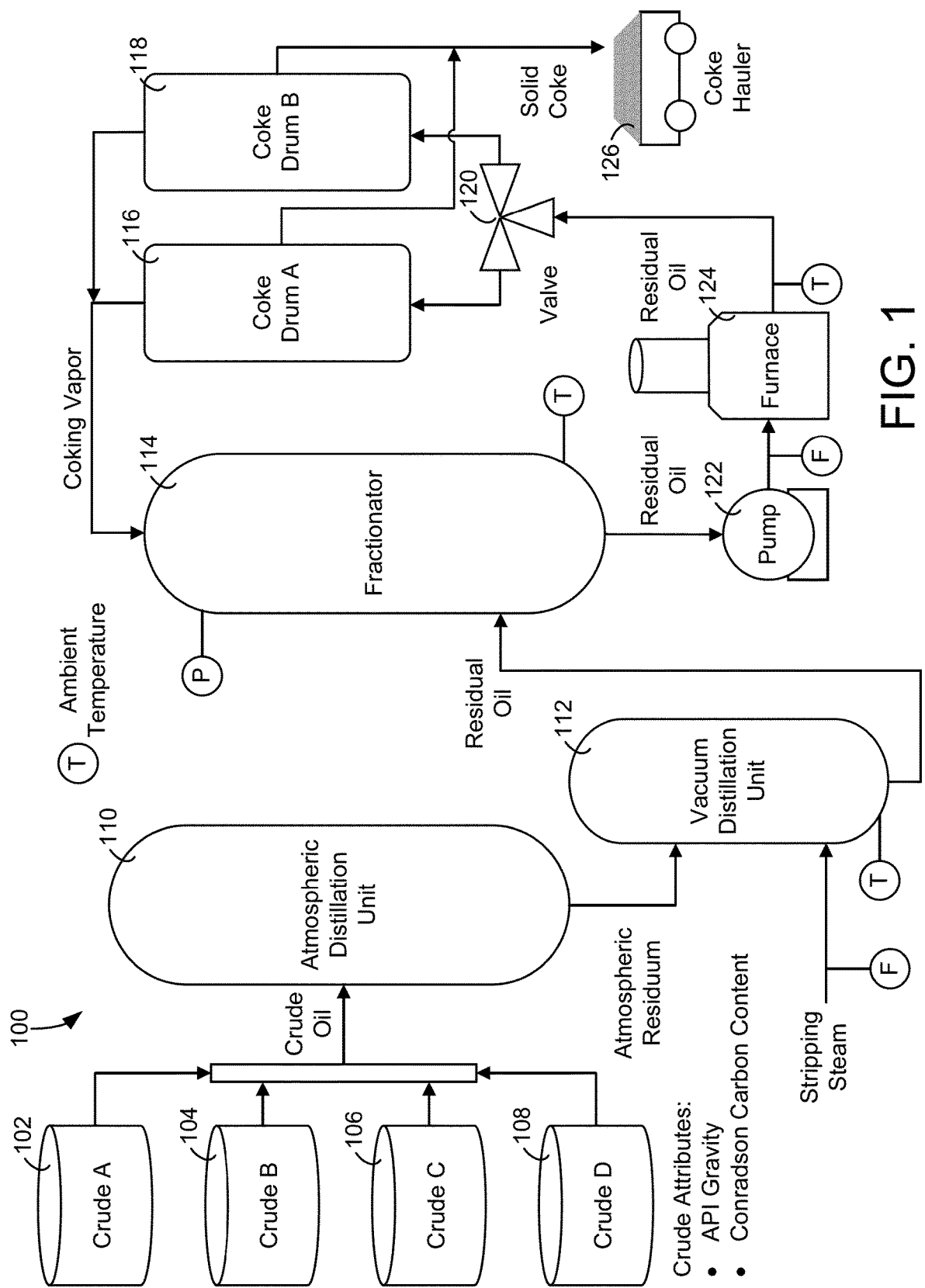
FIG. 1 is a diagram of a petroleum refinery system, accordingly to some embodiments.

Referring now to FIG. 1, a system 100 for refining petroleum to transform crude oil (or other crude petroleum products) into more useful products (e.g., gasoline, petrol, kerosene, etc.) is shown, according to exemplary embodiments. FIG. 1 depicts a general system for refining crude oil, but systems including other refinery tools (e.g., a de-salter for the crude oil, hydrocrackers, hydrotreaters, etc.), different configurations of system 100 that include the same components, more or less drums and/or storage containers, and other modifications to system 100 can be considered. System 100 is shown to include crude oil storage tanks (e.g., "oil tanks") 102-108, atmospheric distillation unit (ADU) 110, vacuum distillation unit (VDU) 112, fractionator 114, coke drums 116,118, valves 120, pump 122, furnace 124, and coke hauler 126.

Before describing the components of system 100 in detail, it is noted that although system 100 is described primarily as refining oil, it should be understood that the systems and methods described herein can be used to refine or produce any of a variety of petroleum products. For example, system 100 can be operated to produce butane, methane, diesel fuel, fuel oil, gasoline, kerosene, liquefied natural gas, liquefied petroleum gas, propane, microcrystalline wax, napalm, naphtha, naphthalene, paraffin wax, petroleum jelly, petroleum wax, refined asphalt, refined bitumen, refined petroleum gas, slack wax, sulfur, petroleum coke, petrochemicals, or any other type of petroleum product. In general, system 100 may be configured to convert one or more input petroleum products into one or more output or derived petroleum products. Although system 100 is described primarily as producing petroleum coke (referred to herein as "coke") as the derived petroleum product, it should be understood that the systems and methods described herein can be applied to any type of petroleum product without departing from the teachings of the present disclosure.

Oil tanks 102-108 may represent the mechanical components and/or methods for storing and providing petroleum into system 100. As disclosed herein, the terms "petroleum" and "crude oil" may be used interchangeably when referring to the mixture of hydrocarbons received prior to oil refining. In some embodiments, the oil stored in oil tanks 102-108 has an American Petroleum Institute (API) gravity of 15-45 degrees, wherein a high API indicates a lower density crude oil and a low API indicates a higher density crude oil. In some embodiments, the oil stored in oil tanks 102-108 has a lower or higher API gravity. In some embodiments, the level of concarbon content (CCR) (e.g., Conradson carbon residue, etc.) is measured to provide an indication of the coke-forming tendencies of the crude oil, prior to providing crude oil to system 100 via oil tanks 102-108. The crude oil stored in oil tanks 102-108 may be recovered through various forms of oil drilling and/or natural petroleum springs. A pumping system may then transfer the received crude oil to store in oil tanks 102-108 and provide the crude oil into atmospheric distillation unit 110.

ADU 110 may be configured to superheat the received crude oil to temperatures that separate the crude oil into its various naturally-occurring components, such as gasoline, kerosene, diesel, fuel oil, and residual oil. While FIG. 1 shows a single atmospheric distillation unit, system 100 may include any number of atmospheric and/or vacuum distillation units for refining the crude oil. Additionally, the crude oil may be preheated (e.g., by a furnace, by one or more tube-still heaters, etc.) such that the crude oil enters ADU 110 at a temperature where some or most of the crude oil is already vaporized. For example, crude oil may be preheated to a temperature of 250-260° C. The oil then enters a tube-still heater to reach a temperature of 350-360° C., where it is then fed into ADU 110. Upon entering ADU 110, the crude oil is further heated to increase vaporization of the crude oil. The vapor rises within ADU 110 and separates to fractions (e.g., subcomponents, layers, levels, etc.). These fractions may be determined by the temperature at which the vapor phase changes back into a liquid. As such, once the vapor reaches an appropriate fraction layer, the vapor changes back into a liquid and is successfully separated into a distillate of the crude oil. Various distillates may be produced via ADU 110, including light distillates (e.g., liquid petroleum gasoline (LPG), gasoline, naphtha, etc.), middle distillates (e.g., kerosene, jet fuel, diesel, etc.), heavy distillates (e.g., fuel oil, etc.), and residuum (e.g., heavy fuel oil, lubricating oils, vax, asphalt, etc.). In a general embodiment, light distillates may have a boiling point around 150-200° C., middle distillates may have a boiling point around 250-300° C., heavy distillates may have a boiling point around 300-350° C., and residuum may have a boiling point around 350° C. and above. The processes performed by ADU 110 may be referred to a fractional distillation or fractionation. ADU 110 is shown providing the distilled residuum to VDU 112 for further distillation.

VDU 112 may act as another process for distilling petroleum products in a heated container. As shown in FIG. 1, the crude oil residuum is provided to VDU 112 for further distillation. System 100 further shows stripping steam entering VDU 112, which may be included in the distillation process. The stripping steam may be controlled based on flow measurements taken by flow sensors, prior the stripping steam entering VDU 112. VDU 112 may perform vacuum distillation, a process similar to ADU 110, but in a vacuum or close to a vacuum (e.g., 10 mmHg, 20 mmHg, etc.). This process for distilling crude oils may help to produce petroleum products from heavier oils left over from atmospheric distillation, as the low pressure in the vacuum decreases the boiling point for the petroleum products in the crude oil. VDU 112 may produce similar distillates as ADU 110 and decrease the overall residuum left over after distillation. However, residuum from the vacuum distillation of VDU 112 may still be present, and is sent to fractionator 114 for further processing.

Fractionator 114 (in combination with pump 122, furnace 124, and drums 116,118) may be configured to act as a coking system and convert the residual oil from VDU 112 into more distillates, such as hydrocarbon gases, naphtha, gas oils, and coke. Fractionator 114 may be similar to ADU 110 in that it separates the feed (e.g., received crude oil) and separates the feed into various distillates using heat. In a general embodiment, fractionator 114, coke drums 116,118, valves 120, pump 122, and furnace 124 are all part of a coker system (e.g., coker process, coker unit, etc.) configured to process the residual oil received in fractionator 114.

For example, residual oil enters fractionator 114 via VDU 112. Pumping the incoming residual oil into the bottom of fractionator 114, rather than directly into furnace 124, preheats the residual oil by having it contact hot vapors (e.g., coking vapor, gas oil vapors, etc.) in the bottom of fractionator 114. Additionally, some of the hot vapors may condense into a high-boiling liquid, recycling back into furnace 124 along with the heated residual oil. The temperature inside of fractionator 114 may be measured by one or more temperature sensors, as shown in FIG. 1.

The residual oil is then pumped through pump 122 to furnace 124. Here, the residual oil is heated to a cracking temperature (e.g., 480° C.) at which the long hydrocarbon molecules of the residual oil break, converting the residual oil into lighter components (e.g., gas oil, etc.) and petroleum coke. To mitigate deposition of coke within piping to coke drums 116,118, steam may be injected into fractionator 114 along with the residual oil (not shown in FIG. 1). Cracking continues to occur in coke drums 116,118 as gas oil and other distillates turn into vapor and return to fractionator 114. The solid coke is deposited into coke drum 116 via operation of valve 120. Once coke drum 116 is filled (e.g., reached its intended fill point, reached a drum outage target of zero, etc.), coke drum 118 is opened and coke drum 116 is closed. The heated residual oil from furnace 124 is routed to the second drum (coke drum 118). While filling coke drum 118, coke drum 116 is steamed out (e.g., forcibly injected with steam) to lower the hydrocarbon content within the coke. Once one or more coke drums are filled, the coke is discharged from the drums and hauled away via coke hauler 126.

As disclosed herein, coke may refer to any raw petroleum coke (e.g., green coke) produced in a coker (e.g., a delayed coker, a non-delayed coker, etc.). The coke may include any combination of components including carbon, hydrogen, nitrogen, sulfur, and ash. Additionally, the coke may include any combination of metals, including aluminum, boron, calcium, chromium, cobalt, iron, manganese, magnesium, molybdenum, nickel, potassium, silicon, sodium, titanium, and vanadium. In a general embodiment, the coke is mostly carbon byproducts from the heavy distillates produced in ADU 110.

Coker Process Control System

Figure 2:
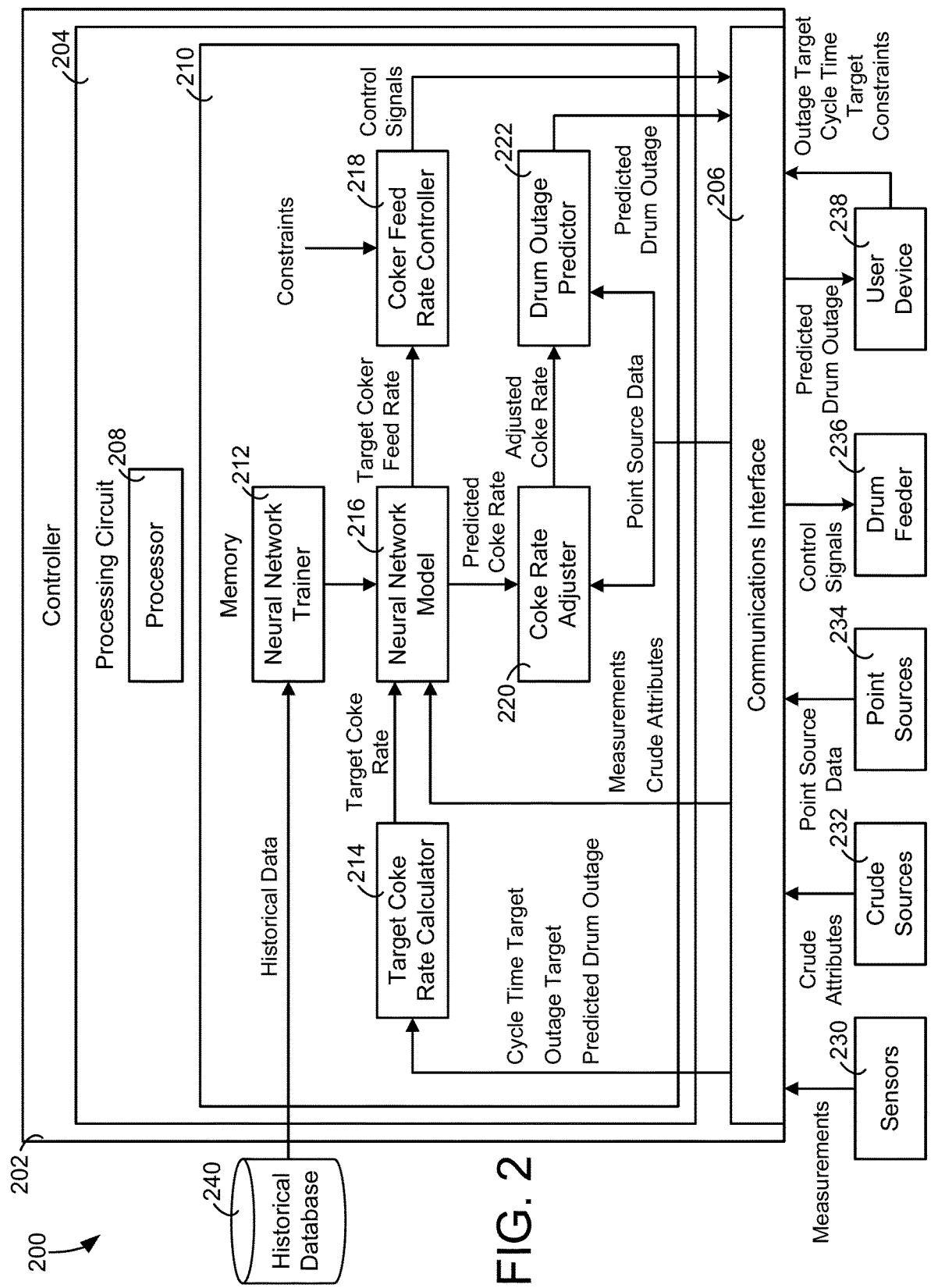
FIG. 2 is a block diagram of a controller, which can be used to control the system of FIG. 1, according to some embodiments.

Referring now to FIG. 2, a system 200 for monitoring, controlling, and optimizing the processing for refining residual oil in a coker unit is shown, according to some embodiments. System 200 is shown to include controller 202 and other components (e.g., sensors 230, crude sources 232, point sources 234, drum feeder 236, user device 238, etc.) and can include some or all parts of system 100 as shown in FIG. 1. Controller 202 may be configured to perform site linear programming (LP), real time optimization (RTO), base control, and control logic based on a neural net, processes that are described in greater detail below. In some embodiments, controller 202 is implemented within a single computer (e.g., one server, one housing, etc.). In various other embodiments controller 202 can be distributed across multiple servers or computers (e.g., that can exist in distributed locations).

Controller 202 is shown to include a communications interface 206 and a processing circuit 204. Communications interface 206 may facilitate communications between controller 202 and external applications (e.g., point sources 234, drum feeder 236, etc.) for allowing control, monitoring, and adjustment to controller 202. Communications interface 206 may also facilitate communications between controller 366 and various user devices (e.g., user device 238, etc.).

Communications interface 206 can be or include wired or wireless communications interfaces (e.g., jacks, antennas, transmitters, receivers, transceivers, wire terminals, etc.) for conducting data communications with external systems or devices. In various embodiments, communications via communications interface 206 can be direct (e.g., local wired or wireless communications) or via a communications network (e.g., a WAN, the Internet, a cellular network, etc.). For example, communications interface 206 can include an Ethernet card and port for sending and receiving data via an Ethernet-based communications link or network. In another example, communications interface 206 can include a Wi-Fi transceiver for communicating via a wireless communications network. In another example, communications interface 206 can include cellular or mobile phone communications transceivers. In one embodiment, communications interface 206 is a power line communications interface. In other embodiments, communications interface 206 is an Ethernet interface.

Processing circuit 204 is shown to include a processor 208 and memory 210. Processing circuit 204 can be communicably connected to communications interface 206 such that processing circuit 204 and the various components thereof can send and receive data via communications interface 206. Processor 208 can be implemented as a general purpose processor, an application specific integrated circuit (ASIC), one or more field programmable gate arrays (FPGAs), a group of processing components, or other suitable electronic processing components.

Memory 210 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 210 can be or include volatile memory or non-volatile memory. Memory 210 can include database components, object code components, script components, or any other type of information structure for supporting the various activities and information structures described in the present application. According to an exemplary embodiment, memory 210 is communicably connected to processor 208 via processing circuit 204 and includes computer code for executing (e.g., by processing circuit 204 and/or processor 208) one or more processes described herein. Memory 210 is shown to include neural network trainer 212, target coke rate calculator 214, neural network model 216, coker feed rate controller 218, coke rate adjuster 220, and drum outage predictor 222.

Neural network trainer 212 can be configured to train (e.g., create, generate, improve, update, optimize, etc.) a neural network model 216 implemented within controller 202. This may be performed by receiving historical data from historical database 240 and using the historical data as training data to improve the neural network model 216. For example, neural network trainer 212 receives time stamps (e.g., date, hour, minute, and second) of when a coke drum (e.g., coke drum 116) begins filling up with coke and when it reaches the intended fill point (e.g., outage of zero). Neural network trainer 212 may process this data for hundreds or thousands of previously ran coke batches in coke drum 116 to train the neural network model 216.

Neural network model 216 can be configured to act as an artificial neural network capable of learning to perform and improve upon tasks relating to controlling oil refinery processes. Particularly, neural network model 216 receives training information from neural network trainer 212, target coke rate information from target coke rate calculator 214, and real-time system conditions to make predictions (e.g., target coker feed rates, predicted coke rates, etc.) based on trained neural network model 216. Neural network model 216 may be configured to perform control logic based on a neural net to optimize the coke production in the drums of system 100. The neural network may be a control technique that processes historical points, operational and environmental constraints, economic goals, and point data to generate nonlinear models. The various differences between the neural network and base control are described throughout the application. Additionally, the neural network may be referred to as a processing component for implementing control logic or a control decision. Accordingly, the term, "neural network" may refer to implementation of target coker feed rates or predicted coke rates from neural network model 216.

Advantageously, neural network model 216 can be configured to model the relationship between the rate at which coke accumulates within coke drums 116,118 (i.e., the coke rate) and the rate at which residual oil (or other feed material) is fed into coke drums 116,118 (i.e., the coker feed rate). Neural network model 216 may model this relationship as a function of a variety of system conditions including, for example, the API gravity of the crude oil entering system 100, the crude concarbon content of the crude oil entering system 100, ambient temperature, the flow rate of the stripping steam in vacuum distillation unit 112, the flash zone temperature of vacuum distillation unit 112, the overhead pressure within fractionator 114, the flash zone temperature within fractionator 114, the outlet temperature of the residual oil exiting furnace 124, or any other factor that may impact the relationship between coker feed rate and coke rate. These types of system conditions are shown in FIG. 2 as measurements from sensors 230 (e.g., the various sensors shown in FIG. 1) and crude attributes from crude sources 232.

In some embodiments, neural network model 216 uses the modeled relationship between coker feed rate and coke rate to predict a target coker feed rate needed to achieve a target coke rate in view of current system conditions (e.g., measurements, crude attributes, etc.). For example, a target coke rate can be calculated by target coke rate calculator 214 (described in greater detail with reference to FIGS. 3-4) and provided as an input to neural network model 216. Neural network model 216 can use the target coke rate calculator 214 in combination with measurements from sensors 230 and crude attributes from crude sources 232 to generate a target coker feed rate predicted to result in coke accumulating within coke drums 116,118 at the target coke rate. The target coker feed rate can be provided to coker feed rate controller 218, which generates control signals for drum feeder 236. The control signals may cause drum feeder 236 to feed residual oil (or other feed material) into coke drums 116,118 at the target coker feed rate. In some embodiments, coker feed rate controller 218 applies a set of constraints to the target coker feed rate and makes adjustments to the control signals, as described in greater detail with reference to FIGS. 14-16.

In some embodiments, neural network model 216 uses the modeled relationship between coker feed rate and coke rate to predict a coke rate that will result from the actual coker feed rate in view of current system conditions (e.g., measurements, crude attributes, etc.). For example, neural network model 216 may receive measurements or other data indicating the actual coker feed rate at which drum feeder 236 is operating. Neural network model 216 may predict the coke rate as a function of the coker feed rate and provide the predicted coke rate to coke rate adjuster 220. Coke rate adjuster 220 can be configured to adjust the predicted coke rate using the point source data from point sources 234, as described in greater detail with reference to FIGS. 10-11. The adjusted coke rate can be provided as an input to drum outage predictor 222, which determines the drum outage (i.e., an amount of empty space in whichever drum 116,118 is currently being filled) as a function of the adjusted coke rate, as described in greater detail with reference to FIGS. 12-13. The predicted drum outage can be provided as an output to user device 238 via communications interface 206 and/or used internally by controller 202 (e.g., by coker feed rate controller 218) to control the various devices of systems 100-200.

Target Coke Rate Calculator

Figure 3:
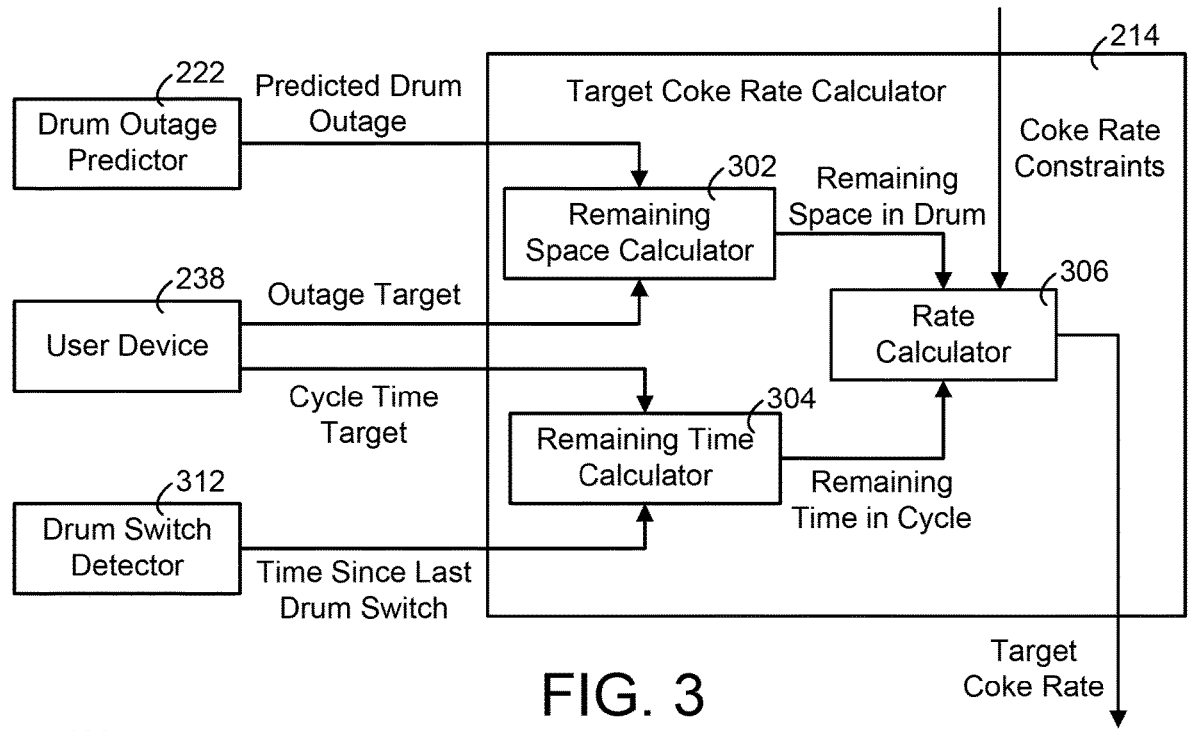
FIG. 3 is a block diagram of a target coke rate calculator, which can be implemented by the controller of FIG. 2, according to some embodiments.

Referring now to FIG. 3, a detailed block diagram of target coke rate calculator 214 is shown, according to exemplary embodiments. Target coke rate calculator 214 can be configured to determine the target rate at which to accumulate coke within coke drums 116,118, referred to herein as the "target coke rate." In some embodiments, the target coke rate is specified as a time rate of change in the coke level (e.g., ft./min., inches/second, cm/second, m/min, etc.). The target coke rate may be calculated in order to achieve a desired outage target within a desired amount of time. Target coke rate calculator 214 may take into account cycle time targets, outage targets, predicted drum outages, and other criteria to determine a target coke rate. As described herein, a target coke rate can refer to the desired rate at which to generate coke in coke drums 116,118. For example, if coke has been generated up to the 4 m mark (e.g., which can be determined by point source data, etc.) in coke drum 116 after 20 minutes, coke drum 116 may be filling up at an average coke rate of 0.2 m/min. In some embodiments, the coke rate may be recalculated after a certain predetermined period of time (e.g., 5 min, 10 min, etc.). This may be referred to as a neural network step. In some embodiments, the neural network step is a constant interval of time that allows control decisions to be made at every step. Similar embodiments are described in greater detail with reference to FIGS. 3-4.

Target coke rate calculator 214 is shown receiving a predicted drum outage from drum outage predictor 222 and an outage target from user device 238. Target coke rate calculator 214 can be configured to determine a target coke rate that satisfies user constraints (e.g., outage target, etc.) and coke rate constraints. In a general embodiment, drum outage predictor 222 is a module within controller 202 responsible for predicting the drum outage within a coke drum. As disclosed herein, drum outage or simply "outage" can refer to the difference between the absolute maximum fill level in the drum and the current fill level within the drum. When the target outage level is determined to be reached, the drum cycle may be considered complete and the coke is emptied from the drum. For example, if coke drum 116 is 20 m tall, the target outage level may be 12 m, allowing 12 m of height above the fill level for potential foam-over, space for coking vapor, etc. Once 12 m of outage is reached, the coke is emptied from coke drum 116.

In some embodiments, the outage target is received from a user device 238. Selecting an appropriate outage target may ensure efficient operation of system 100. For example, if the outage target is too low (i.e., the absolute maximum fill level and actual fill level are too close) coke drum 116 may "foam over." Foam exists in coke drums as the hot vapors of the disengaging gasses separate from the coal tar pitch in the crude oil in the coke drum. As the coke drum begins to fill up with solid coke, the liquid level and the foaming head are pushed up. If left unchecked, the foam may approach the top of the coke drum and potentially exit the drum, inducing foam-over. Conversely, if the outage target is too high (i.e., the absolute maximum fill level and actual fill level are too far distanced), coke yield may be significantly decreased and hinder productivity.

Drum outage predictor 222 may predict the current drum outage based on the point source data received by point sources 234 to optimize coke production. Point sources 234 may include past or present data relating to the density and/or other characteristics of the crude oil/coke composition within the coke drum, which provides an indication of where the coke is presently located within in the drum. This, combined with a determined coke rate (e.g., via neural network model 216 and coke rate adjuster 220) allows drum outage predictor 222 to predict the current drum outage level and provide the current drum outage level to target coke rate calculator 214. The operations performed by drum outage predictor 222 are described in greater detail with reference to FIGS. 12-13. The predicted drum outage is received by remaining space calculator 302.

Remaining space calculator 302 can use the predicted drum outage and outage target to calculate the remaining space in the drum. In some embodiments, this is done by subtracting the outage target from the predicted drum outage. The remaining space in the drum represents the amount of space that needs to be filled to reach the outage target. For example, if the outage target is 12 m and the current/predicted drum outage is 16.1 m, the remaining space in the drum is the difference between 16.1 m and 12 m (i.e., 4.1 m). In some embodiments, the outage target, as well as various other targets or measurements, may be measured, provided, and/or monitored using measurements measured via the metric system (e.g., m, etc.). The outage target is shown to be provided by user device 238. User device 238 may be one or more smartphones, computers, tablets, or other personal device configured to provide control instructions to controller 202. In some embodiments, user device 238 is a workstation within or near system 100. In a general embodiment, target coke rate calculator 214 (e.g., via remaining space calculator 302) determines the amount of remaining space to be filled in the drum by subtracting the outage target (received by user device 238) from the predicted drum outage (received by drum outage predictor 222). Remaining space calculator 302 then provides the determined remaining space in the coke drum to rate calculator 306. Rate calculator 306 is shown to receive another set of data from remaining time calculator 304.

Figure 9:
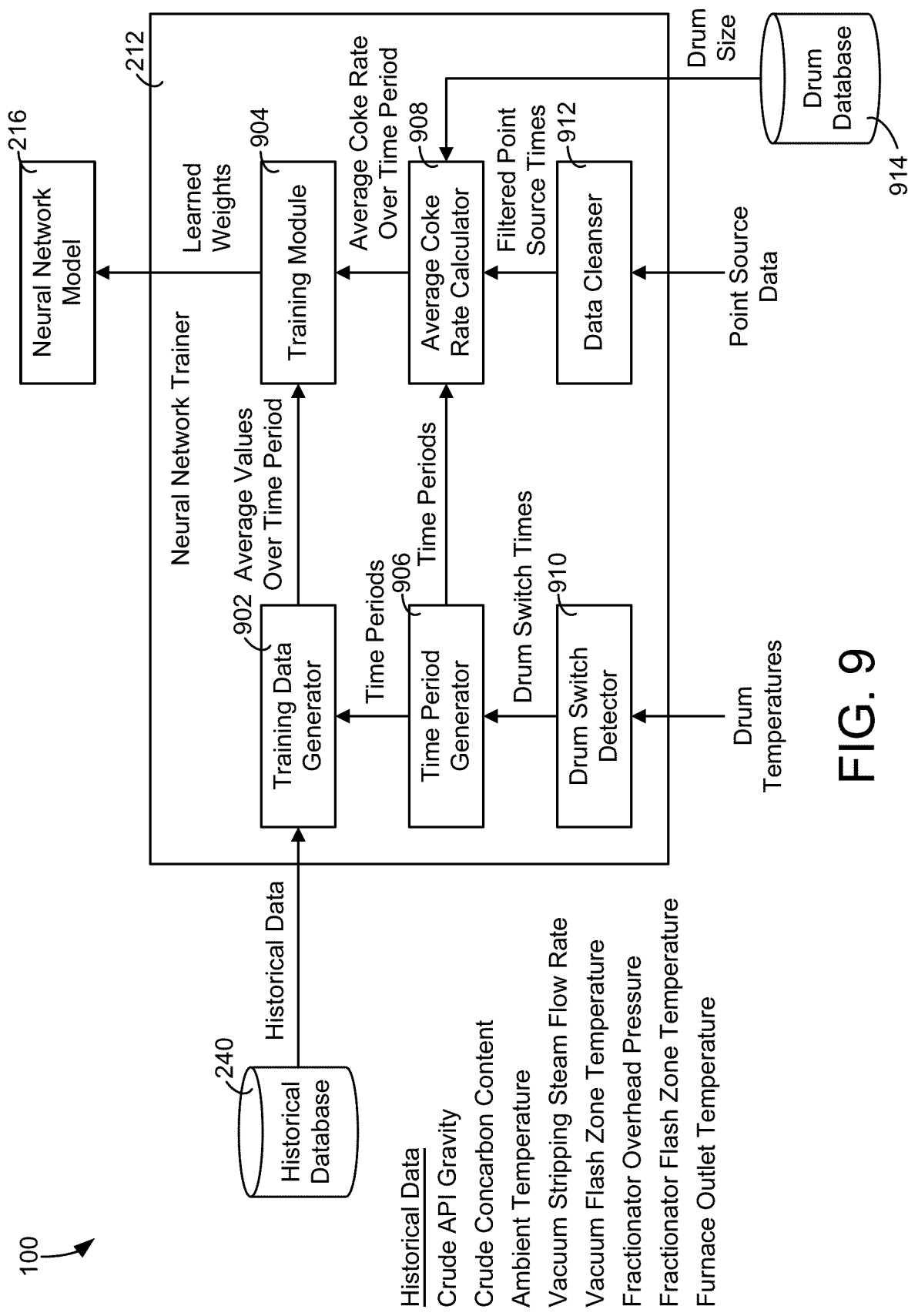
FIG. 9 is a block diagram of a neural network trainer, which can be implemented by the controller of FIG. 2, according to some embodiments.

Remaining time calculator 304 can be configured to determine the remaining time left within the cycle (e.g., period for generating a complete batch of coke within the coke drum, etc.). In an exemplary embodiment, user device 238 provides a cycle time target to remaining time calculator 304. This may indicate the total amount of time within which the user (e.g., system operator, control team, engineer, etc.) wishes to complete the cycle. Remaining time calculator 304 is shown to receive a time since the last drum switch from drum switch detector 312. Drum switch detector 312 may be another module within controller 202 (e.g., within neural network trainer 212 as shown in FIG. 9, etc.) configured to determine the time since the last drum switch. These outputs may be based on drum time data and/or drum temperature data received by various sensors 230 located within system 100. In other embodiments, the data is received from historical database 240. Once remaining time calculator 304 receives a cycle time target and the time since the last drum switch, remaining time calculator 304 determines the amount of remaining time in the drum cycle by subtracting the time elapsed since the last drum switch from the cycle time target. For example, if the cycle time target is 3 hours and the time since the last drum switch is 2.5 hours, remaining time calculator 304 may determine that 0.5 hours remain in the current drum cycle. Remaining time calculator 304 may then provide the remaining time in the cycle to rate calculator 306.

Rate calculator 306 can be configured to determine a target coke rate at which to generate coke within the coke drum, based on (i) the remaining space left in the drum and (ii) the remaining time left in the cycle. For example, if 12 m of drum space remains to be filled in the coke drum during this optimization process and 10 hours are left remaining in the cycle, the coke rate would need to be, on average, 0.02 m every minute. In some embodiments, the target coke rate is continually changing after every neural network step. Once determined, the target coke rate can then be provided to neural network model 216 for further processing.

Figure 4:
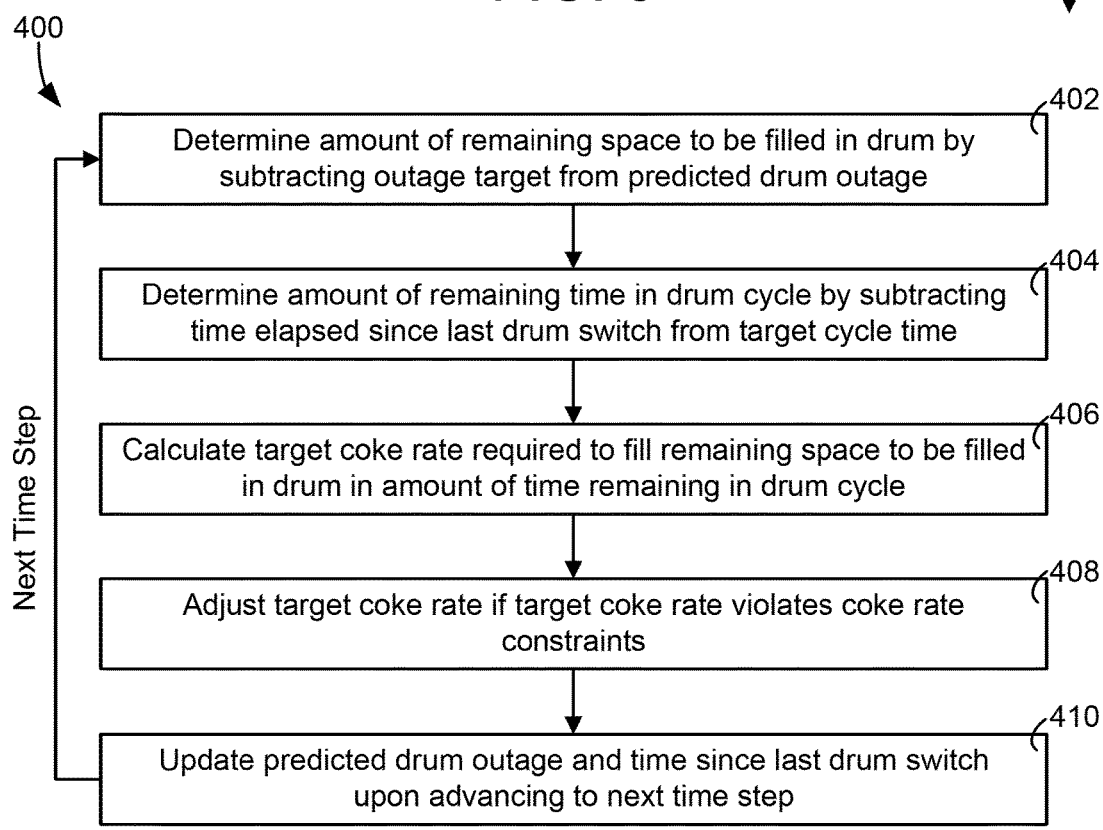
FIG. 4 is a flow diagram of a process for determining a target coke rate calculator, which can be performed by the calculator of FIG. 3, according to some embodiments.

Referring now to FIG. 4, a process 400 for calculating the target coke rate via target coke rate calculator 214 is shown, according to exemplary embodiments. Process 400 may be performed by target coke rate calculator 214 as described above with reference to FIGS. 2-3. Process 400 may be similar to the processes described above regarding target coke rate calculator with reference to FIG. 3.

Process 400 is shown to include determining the amount of remaining space to be filled in the drum by subtracting the outage target from the predicted drum outage (step 402). This step can be performed by remaining space calculator 302. Remaining space calculator 302 can receive the predicted drum outage from drum outage predictor 222 and the outage target from user device 238 and take the difference to determine the remaining space in the drum. Remaining space calculator 302 may determine the remaining space in the drum in various ways and is not limited to the methods disclosed herein. Additionally, remaining space calculator 302 may determine the space presently used or filled with coke, rather than the remaining space. Remaining space calculator 302 then provides the determined information to rate calculator 306.

Process 400 is shown to include determining the amount of remaining time in the drum cycle by subtracting the time elapsed since the last drum switch from the cycle time target (step 404). This step can be performed by remaining time calculator 304. Remaining time calculator 304 can receive the cycle time target from user device 238 and the time since the last drum switch from drum switch detector 312. Remaining time calculator 304 may then determine the remaining time in the drum cycle by taking the difference between the cycle time target and the time since the last drum switch.

Process 400 is shown to include calculating the target coke rate required to fill the remaining space in the drum and the amount of time remaining in the drum cycle (step 406). In some embodiments, rate calculator 306 can determine the target coke rate based on the received remaining space in the coke drum via remaining space calculator 302 and the remaining time in the cycle via remaining time calculator 304. Rate calculator 306 may divide these terms to determine a distance per time relationship, indicating the rate at which coke needs to fill the coke drum to satisfy the imposed constraints (e.g., user-defined outage target, coke rate constraints, etc.).

Process 400 is shown to include adjusting the target coke rate if the target coke rate violates the coke rate constraints (step 408). In some embodiments, coke rate constraints may be imposed on target coke rate calculator 214 that force the calculated coke rate to remain within operational bounds, such that the plan (e.g., system, system 100, the feeder, etc.) is capable of achieving the intended coke rate. In the event the calculated coke rate is outside of the bounds of the coke rate constraints, rate calculator 306 may re-calculate the target coke rate. This may result in deficiencies in satisfying other requirements, such as completing the coke cycle in the intended cycle time target provided by user device 238.

Process 400 is shown to include updating the predicted drum outage and time since the last drum switch upon advancing to the next time step (step 410). Upon completion of determining a target coke rate, target coke rate calculator 214 can update the predicted drum outage and time since the last drum switch and return to step 402 to restart the process. In a general embodiment, process 400 is being implemented by controller 202 on a continual basis during coke production within the coke drum. As certain variables are dynamic with respect to FIGS. 3-4 (e.g., predicted drum outage, etc.), process 400 continually updates the target coke rate to optimize the rate at which the coke drum achieves the outage target. In other embodiments, process 400 is performed not on a continuous basis (e.g., once before coke production, once during coke production, once before and during coke production) and the discreet target coke rates are provided to neural network model 216 accordingly.

Neural Network Model

Figure 5:
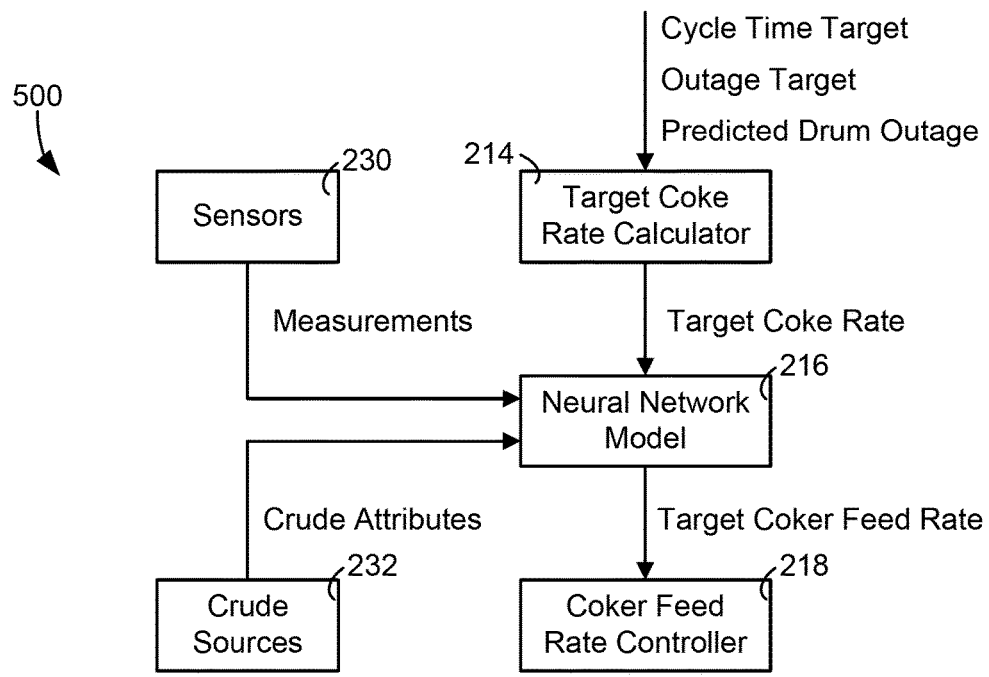
FIG. 5 is a block diagram of a system for determining a target coker feed rate, which can be performed by the controller of FIG. 2, according to some embodiments.

Referring back to FIG. 2, neural network model 216 is shown to receive a target coke rate from target coke rate calculator 214. Neural network model 216 is also shown to receive various measurements and attributes of the crude oil from communications interface 206. In some embodiments, neural network model 216 is configured to predict a target coker feed rate needed to achieve the target coke rate provided by target coke rate calculator 214. This target coker feed rate may be based on various real-time system conditions, such as the measurements and attributes received at neural network model 216. FIG. 5 shows this process in greater detail.

Referring now to FIG. 5, system 500 for predicting a target coker feed rate to achieve a target coke rate is shown, according to exemplary embodiments. System 500 may be incorporated partially or entirely into system 100 and/or 200. In the exemplary embodiment, neural network model 216 is receiving the target coke rate from target coke rate calculator 214, along with sensor measurements (e.g., temperature measurements of coke drum 116, flow measurements from the feed, ambient temperature measurements, etc.) from sensors 230 and crude attributes (e.g., oil density, sodium content, carbon content, etc.) from crude sources 232. Neural network model 216 may then predict the target coker feed rate such that it satisfies the target coke rate within the constraints provided by the real-time system conditions (e.g., measurements from sensors 230, crude attributes from crude sources 232, etc.). Neural network model 216 may take real-time system conditions into consideration when determining a target coker feed rate. For example, crude attributes received from crude sources 232 indicate that the crude oil is high in sodium content, which can increase the rate of cracking. As such, neural network model 216 reduces the target coker feed rate from the original intended target coker feed rate to adjust for the high sodium.

Figure 6:
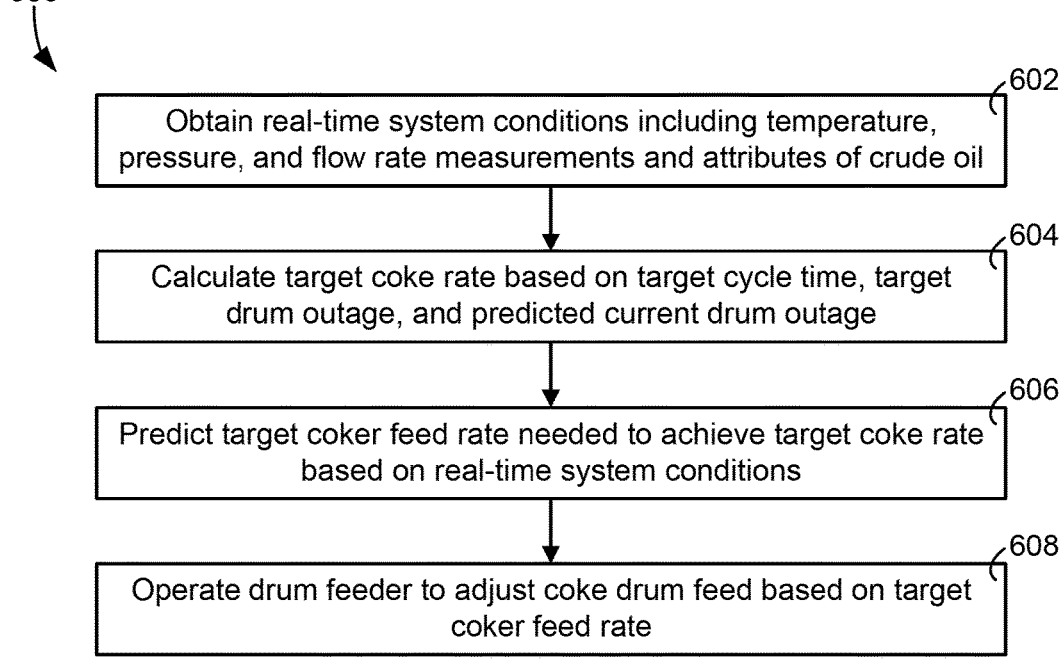
FIG. 6 is a flow diagram of a process for determining a target coker feed rate, which can performed by the system of FIG. 5, according to some embodiments.

Referring now to FIG. 6, a process 600 for predicting the target coker feed rate needed to achieve a target coke rate based on real-time system conditions. Process 600 may be performed by neural network model 216 or any other module shown within controller 202. In a general embodiment, process 600 is a process performed by a model (e.g., neural network model 216) that combines a received coke rate setpoint (e.g., target coke rate from target coke rate calculator 214) with real-time system conditions to produce a real-time target coker feed rate. In some embodiments, every step of process 600 is performed at a neural network step. In other embodiments, process 600 is performed at every neural network step.

Process 600 is shown to include obtaining real-time system conditions including temperature, pressure, and flow rate measurements and attributes of crude oil (step 602). In some embodiments, neural network model 216 receives temperature measurements from the interior of coke drum 116 or another coke drum being monitored/controlled by controller 202, temperature measurements from the ambient air around the coke drums, flow rate measurements measure the feed (e.g., the pump/inlet subsystem that provides the crude oil or residuum to fractionator 114, flow rates of the coking vapor returning to fractionator 114, flow rates after pump 122 to pump coke/steam to coke drums 116,118, temperature measurements of the fluid after leaving furnace 124, and various others. Neural network model 216 may also receive various crude attributes relating to the incoming crude oil and residuum entering fractionator 114. These crude attributes can include the elemental properties (e.g., how carbon-rich is it, high sodium content, etc.), aromatic properties (e.g., is the fluid highly paraffinic, etc.), density, viscosity, and various other properties. Neural network model 216 can process any of these data sets to aid in determining an appropriate target coker feed rate.

Process 600 is shown to include calculating the target coke rate based on the cycle time target, the target drum outage, and the predicted current drum outage. This step may be similar to the process described with reference to FIG. 4. Target coke rate calculator 214 determines a target coke rate based on user constraints (e.g., outage target, cycle time target), time since last drum switch, and predicted drum outage. As discussed above, target coke rate calculator 214 can include more or less variables in determining a target coke rate.

Process 600 is shown to include predicting a target coker feed rate needed to achieve the target coke rate based on real-time system conditions. Neural network model 216 may utilize a neural network to accurately determine the target coker feed rate. Training data from previous batches (e.g., temperature data, carbon contents of previous batches, density and/or viscosity of previous batches, etc.) may be used to train neural network model 216. Crude oil entering fractionator 114 may follow trends regarding the attributes of the crude oil that, when processed, improve the accuracy of neural network model 216.

Process 600 is shown to include operating the drum feeder 236 to adjust the coke drum feed based on the target coker feed rate (step 608). Once the target coker feed rate is determined, coker feed rate controller 218 operates the feed pump (e.g., pump 122, a pump pumping residual oil into fractionator 114, etc.) that allows the target coker feed rate to be satisfied.

Neural network model 216 may not be limited to determining a target coke rate and then predicting a target coker feed rate to satisfy the target coke rate. Neural network model 216 may also work in the reverse, by determining the feed rate for the coke drum and, based on real-time system conditions, predicting a coke rate of the coke being generated within the coke drum. This process is disclosed with reference to FIGS. 7-8. In some embodiments, the neural network model may be the same as or similar to any of the neural network models described in U.S. Patent Application Publication 2019/0236447, the entire disclosure of which is incorporated by reference herein.

Figure 7:
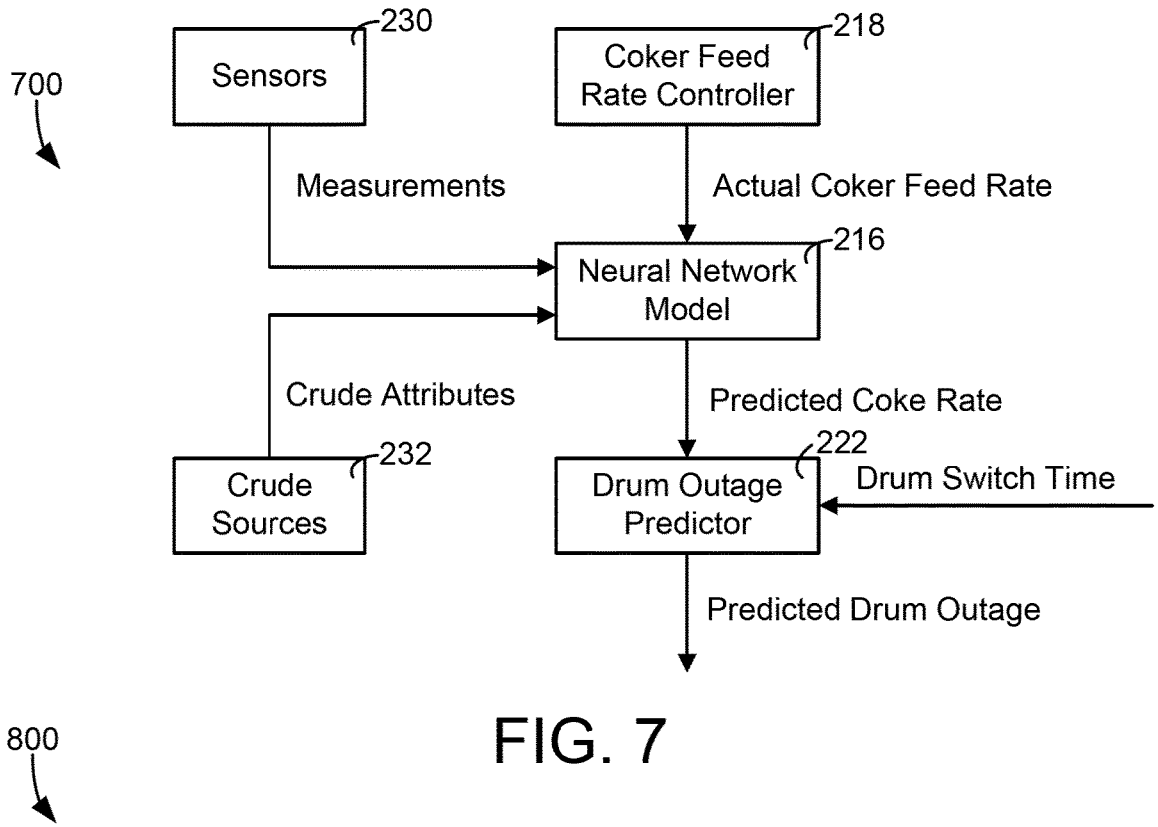
FIG. 7 is a block diagram of a system for predicting a coke rate, which can be performed by the controller of FIG. 2, according to some embodiments.

Referring now to FIG. 7, a system 700 for predicting a coke rate from an actual coker feed rate and real-time system conditions is shown, according to exemplary embodiments. System 700 may be incorporated partially or entirely into system 100 and/or 200. System 700 shows neural network model 216 receiving an actual coker feed rate (as opposed to a target coker feed rate) from coker feed rate controller 218. The actual coker feed rate can be determined by signals provided by flow rate sensors at or near the feed to fractionator 114, but could also use predicted drum outage, drum switch time, other sensor measurements, point source data, and user constraints in determining the actual coker feed rate. Actual coker feed rate may be directly measured. Upon receiving the actual coker feed rate from coker feed rate controller 218, neural network model 216 predicts the coke rate occurring in fractionator 114 based on real-time system conditions (e.g., sensor measurements, crude attributes etc.). Once neural network model 216 knows the amount of crude oil entering the drum, real time sensor data (e.g., data of temperatures within the drum, etc.) combined with historical data (e.g., typical batch time at particular feed rate, etc.) can allow neural network model 216 to generate a predictive coke rate without directly measuring the coke rate occurring within the drum.

Figure 8:
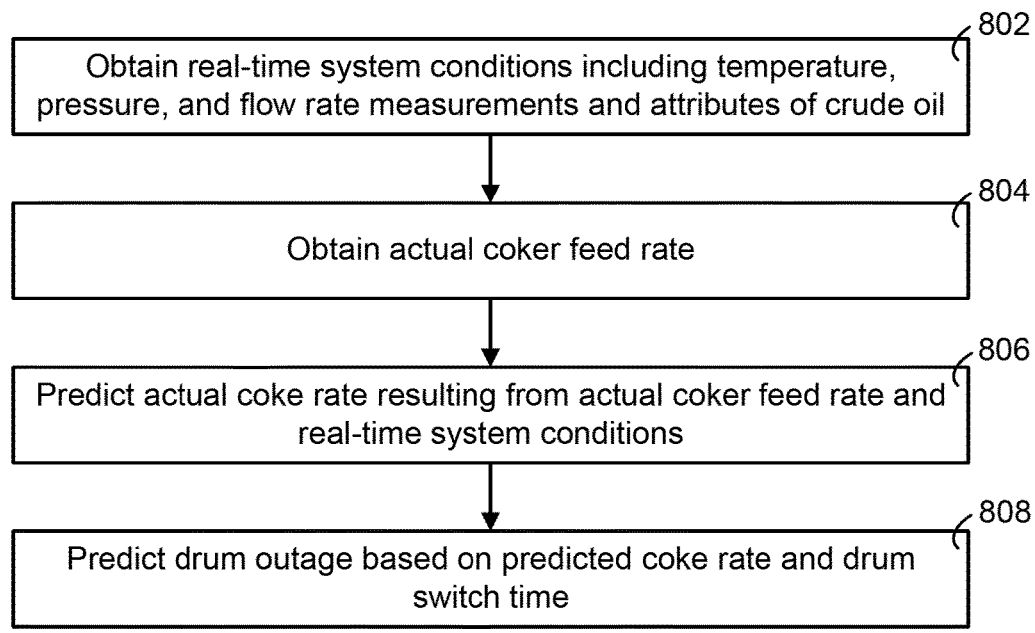
FIG. 8 is a flow diagram of a process for predicting a coke rate from a coker feed rate, which can be performed by the system of FIG. 7, according to some embodiments.

Referring now to FIG. 8, a process 800 for predicting a coke rate from an actual coker feed rate and real-time system conditions is shown, according to exemplary embodiments. Process 800 can be performed by neural network model 216 or any other module disclosed within controller 202.

Process 800 is shown to include obtaining real-time system conditions including temperature, pressure, and flow rate measurements and attributes of crude oil (step 802). In some embodiments, neural network model 216 receives various real-time system conditions, including flow measurements of the feed into fractionator 114, temperature measurements of the crude oil entering and exiting fractionator 114, temperature measurements before and after the crude oil (e.g., the fluid) enters and leaves furnace 124. The real-time system conditions can be considered when neural network model 216 needs to determine the predicted coke rate, as the actual coker feed rate is not the only contributing factor; the real-time system conditions can affect the target coke rate as well. For example, the sodium content within the oil entering fractionator 114 can affect the boiling point of the crude oil, as well as the potential for foam-over. Consistent and frequent operating data such as real-time system condition measurements may be provided to neural network model 216 before and during operation.

Process 800 is shown to include obtaining the actual coker feed rate (step 804). In the process of predicting a target coke rate, neural network model 216 will need to receive the actual coker feed rate, which may be received from a flow sensor or other set of measurements determining the flow of the oil into the fractionator or coker (e.g., fractionator 114). For example, neural network model 216 needs to receive the actual coker feed rate (e.g., 10 gpm, 100 gpm, 1000 gpm, 10,000 gpm, etc.) to determine the predicted coke rate (e.g., 0.03 m/hr., 0.09 m/hr., etc.).

Process 800 is shown to include predicting an actual coke rate resulting from an actual coker feed rate and real-time system conditions (step 806). Neural network model 216 may then combine the information from sensors 230 and crude sources 232 with the received actual coker feed rate (or actual flow measurements from a flow meter measuring the feed rate to determine an actual coker feed rate) to generate the predicted coke rate. Once generated, neural network model 216 may provide the predicted coke rate to drum outage predictor 222.

Process 800 is shown to include predicting drum outage based on predicted coke rate and drum switch time (step 808). Drum outage predictor 222 can receive drum attribute information (e.g., drum switch time, length of batches, etc.) and the predicted coke rate to determine the predicted drum outage. For example, if the predicted coke rate is 0.46 m/hr. and the typical or required drum switch time is 13 hours, the predicted drum outage may be 5.94 m.

Neural Network Trainer

Referring now to FIG. 9, a detailed block diagram of neural network trainer 212 is shown. Neural network trainer 212 trains neural network model 216 with various historical data, crude oil density characteristics (e.g., crude American Petroleum Institute (API) gravity, etc.), crude oil carbon characteristics/amounts (e.g., crude Concarbon content (CCR), crude Conradson carbon content, etc.), ambient temperature, vacuum stripping steam flow rate, vacuum flash zone temperature, fractionator overhead pressure, fractionator flash zone temperature, and furnace outlet temperature. Neural network trainer 212 is shown to include training data generator 902, training module 904, time period generator 906, average coke rate calculator 908, drum switch detector 910, and data cleanser 912. In a general embodiment, neural network trainer 212 combines received historical data with real-time system conditions to modify the weights provided to neural network model 216. This can include adjusting the weight of a received input to one or more hidden layers or output layer of the neural network.

Drum switch detector 910 can be configured to detect the times at which drum switches occur based on measurements of the drum temperatures. As described herein, a drum switch is the act of switching the flow of residual oil (or other feed material) from one drum to another drum. Drum temperature may increase while a drum is being filled and decrease after the drum switch occurs. In some embodiments, drum switch detector 910 receives temperature measurements from drums 116,118 (e.g., from sensors 230 or from historical database 240) and detects the times at which the temperatures are substantially equivalent or have reached a predetermined threshold. The times detected by drum switch detector 910 may be designated as the drum switch times. The drum switch times may include a list of times at which drum switches occurred.

Time period generator 906 may use the drum switch times to generate a set of time periods. In some embodiments, each of the time periods start at the time a drum switch occurs and end at the time the next drum switch occurs. Accordingly, each of the time periods may indicate the period during which a given drum is being filled. This information is useful because it allows training data generator 902 to match the timestamped values of historical data from historical database 240 to a given drum fill operation (i.e., to a given time period). For example, training data generator 902 may find all of the values of historical data that fall within each of the time periods generated by time period generator 906 and associate those values of historical data with the corresponding time period.

Training data generator 902 is shown receiving historical data from historical database 240 and time periods from time period generator 906. In some embodiments, training data generator 902 calculates average values for each of the variables of the historical data for each time period. For example, the crude API gravity variable may have several different values at different times within a given time period. Training data generator 902 may calculate an average value of the crude API gravity variable for the given time period by averaging all of the values of the crude API variable that have time stamps within the given time period or are otherwise associated with the given time period. Training data generator 902 may repeat this for all of the other variables for which historical values are available within historical database 240 to calculate an average value of each variable for each time period.

Data cleanser 912 may process incoming point source data (e.g., from sensors 230 or from historical database 240) to remove any false point source times. The point source data may include binary data (e.g., yes/no, on/off, 1/0, true/false, etc.) indicating whether the coke level within coke drums 116,118 has reached a given level. The point source data may originate from sensors 230 installed on or within coke drums 116,118 at various levels. For example, coke drum 116 may have a "13 m" point source sensor located 13 m from the top of coke drum 116 and configured to detect when the coke level within coke drum 116 has reached a level of 13 m from the top of coke drum 116 (i.e., a drum outage of 13 m). Similarly, coke drum 116 may have a "12 m" point source sensor located 12 m from the top of coke drum 116 and configured to detect when the coke level within coke drum 116 has reached a level of 12 m from the top of coke drum 116 (i.e., a drum outage of 12 m). Coke drum 118, as well as any other coke drums in system 100, may have similar point source sensors.

In some cases, the readings from the point source sensors may be accurate indications of coke level within coke drums 116,118. However, foam buildup within coke drums 116,118 above the coke level may trigger the point source sensors to report false positive readings when the true coke level is actually lower. Foam buildup is a transient event that typically dissipates within a predetermined amount of time (e.g., 10-15 minutes). Accordingly, data cleanser 912 can be configured to filter the point source data to remove any positive readings that persist for less than the predetermined amount of time. This has the effect of removing false positive point source readings that were caused by foam buildup. Data cleanser 912 may output a list of filtered point source times. The filtered point source times may indicate the times at which each point source sensor was triggered and remained triggered for the predetermined amount of time within each time period. Accordingly, the filtered point source times represent the times at which the coke level within the coke drums reached a given level (e.g., 4.6 m for the 4.6 m point source, 8 m for the 8 m point source, etc.).

Average coke rate calculator 908 can be configured to calculate the average rate at which coke accumulated within each coke drum 116,118 within each of the time periods. The average coke rate calculation may be similar to the target coke rate calculation as described with reference to FIGS. 3-4. However, instead of using target values of the drum outage and cycle time, average coke rate calculator 908 may use the filtered point source data from data cleanser 912 and the time periods from time period generator 906. For example, average coke rate calculator 908 may use the time periods and the filtered point source data to determine the amount of time that elapsed between the beginning of each time period and the time at which a given point source sensor was triggered. That amount of time represents the time needed for the coke level to increase from zero to the level associated with the point source sensor. For example, if a point source sensor located 19 m from the bottom of coke drum 116 was first triggered 200 minutes after the beginning of the time period, average coke rate calculator 908 may determine that coke accumulated within coke drum 116 at an average coke rate of 19 m/200 minutes, or 0.095 m/min. Average coke rate calculator 908 may repeat this calculation for each of the time periods to determine an average coke rate for each time period.

Training module 904 can be configured to receive the average values of a time period and average coke rate over a time period and determine the learned weights needed for neural network model 216. Examples of training module 904 performing training processes are described in greater detail below with reference to FIGS. 25-26.

Coke Rate Adjuster

Figure 10:
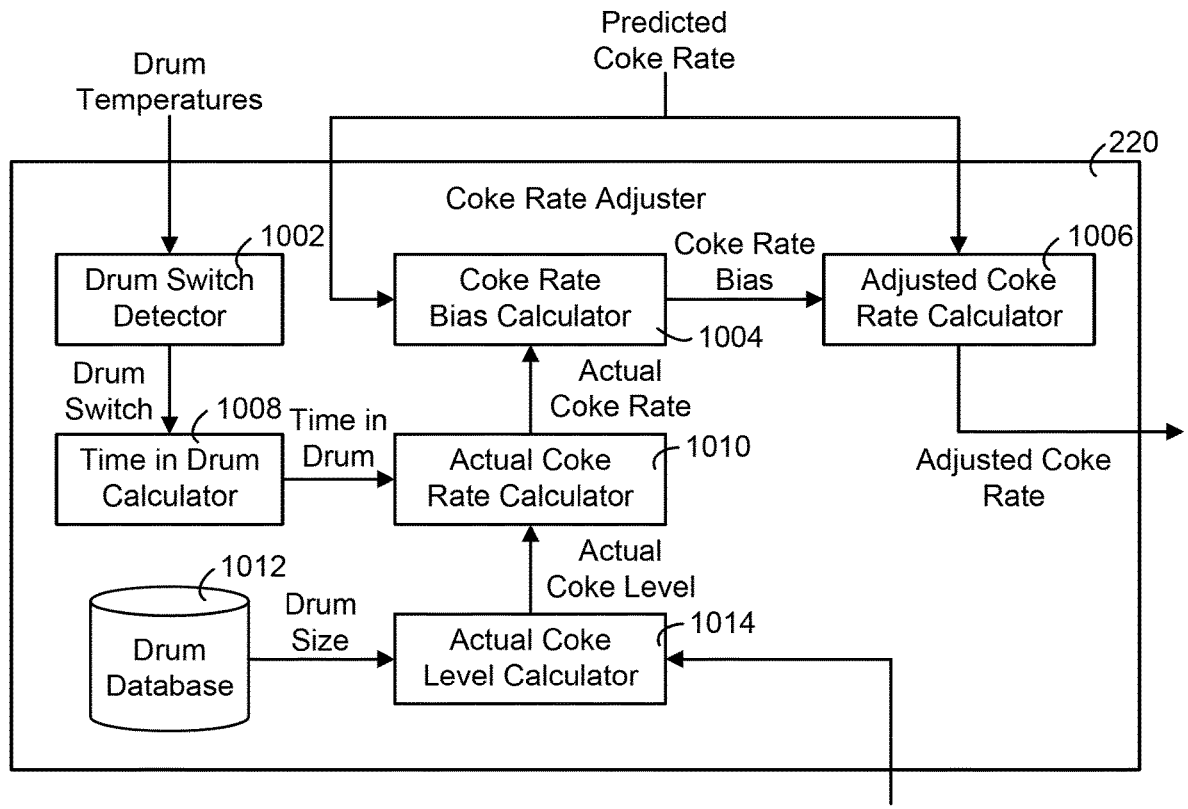
FIG. 10 is a block diagram of a coke rate adjuster, which can be implemented by the controller of FIG. 2, according to some embodiments.

Referring now to FIG. 10, a detailed block diagram of coke rate adjuster 220 is shown, according to some embodiments. Coke rate adjuster 220 can be configured to adjust the predicted coke rate generated by neural network model 216 to account for a coke rate bias. In some embodiments, the coke rate bias is based on real-time data taken from the coke production occurring within coke drums 116,118. The rate of coke being generated may be predicted at a certain rate from neural network model 216 and at a different rate from measurements received within coke drums 116,118. This might include density measurements of coke within coke drums 116,118 being constantly provided to controller 202. Controller 202 (e.g., coke rate adjuster 220) may use this data (e.g., point source data) to adjust the predicted coke rate to be more accurate. Coke rate adjuster 220 is shown to include drum switch detector 1002, coke rate bias calculator 1004, adjusted coke rate calculator 1006, time in drum calculator 1008, actual coke rate calculator 1010, drum database 1012, and actual coke level calculator 1014.

As shown in FIG. 10, the predicted coke rate is provided to coke rate bias calculator 1004. The coke rate bias calculator 1004 takes the predicted coke rate and actual coke rate and determines a coke rate bias. While described herein as the "actual coke rate", every measurement may include some error and may not represent the exact coke rate. In any case, the actual coke rate is determined by actual coke rate calculator 1010. Actual coke rate calculator 1010 takes into account the current level of coke (based on the received point source data) and the time since the last drum switch occurred, shown in FIG. 10 as the "time in drum."

In some embodiments, the time in drum may refer to the amount of time that has elapsed since the most recent drum switch occurred, as detected by drum switch detector 1002. In some embodiments, the time in drum is calculated by time in drum calculator 1008. Time in drum calculator 1008 may receive the time data that indicates the time since the last drum switch and determines the time left in the drum, the current time that the coke is being generated in the drum, or both. As referred to herein, "the drum" and/or "the coke drum" may refer to the location in which coke is being generated and where a feed is supplying residuum to be generated into coke. In other embodiments, the "the drum" and/or "the coke drum" refers to where the coke is being stored. For example, feed enters the fractionator to be generated, then a pump pumps the coke into a drum.

Still referring to FIG. 10, time in drum calculator 1008 receives the data for determining the time in drum from drum switch detector 1002. Drum switch detector 1002 can receive drum temperatures and determine time data from the temperatures. For example, a temperature sensor 8 m high in the drum may indicate that temperatures are exceeding 700° C. at a first instance in time. At a second instance in time, the temperature sensor indicates that the temperature is 200° C. Drum switch detector 1002 may determine that this indicates the drum has emptied since the second instance in time and that a drum switch has occurred. In some embodiments, a temperature sensor is located at the bottom of the drum that, when coke begins filling up within the drum, drum switch detector 1002 receives higher than normal temperatures that indicate the coke drum is beginning to fill up and a drum switch has been made. Various methods of determining a drum switch are considered and are not limited to the embodiments disclosed herein. For example, timers within processing circuit 204 may automatically maintain the exact drum time switches for all coke batches. The time in drum is provided to actual coke rate calculator 1010 for determining the actual coke rate. Actual coke rate calculator 1010 is shown to also receive the actual coke level from actual coke level calculator 1014.

Actual coke level calculator 1014 can be configured to receive drum information (e.g., drum size from drum database 1012, etc.) and the point source data from point sources 234 to determine the actual coke level. As discussed above the "point source data" referred to various data points (e.g., the density of the generated coke, the temperature changes, etc.) to essentially determine how fast the drum is filling up. This can be referred to as the coke rate. In some embodiments, the point source data is obtained via nuclear technology (e.g., receives data at extremely small or nuclear units) and allows for measurements of the density across a certain distance or point of the material within the drum. In this exemplary embodiment, actual coke level calculator 1014 can convert this density data into a level of coke within the drum, with dimension information about the drum received by drum database 1012. Actual coke level calculator 1014 then provides the actual coke level to actual coke rate calculator 1010.

Actual coke rate calculator 1010 combines time in drum with the actual coke level to determine the actual coke rate. For example, if the actual coke level is 6 m and the time that coke has been generating within the drum is 7 hours, then the actual coke rate is 0.86 m/hr. While this exemplary embodiment is relatively straightforward, additional steps may be included in determining the actual coke rate. For example, an error adjustment may be included to account for the uncertainty/error from the point source data. Once the actual coke rate is determined, actual coke rate calculator 1010 provides the actual coke rate to coke rate bias calculator 1004.

Coke rate bias calculator 1004 receives the actual coke rate and the predicted coke rate to determine the appropriate amount of bias to provide such that the predicted coke rate is adjusted. In a general embodiment, the bias determined by coke rate bias calculator 1004 is significantly determined by the point source data provided by point sources 234. Various examples of coke rate bias calculator 1004 implementing a bias adjustment to the predicted coke rate is provided below. Additionally, while the process is not described in detail herein, system 100 may only use the actual coke rate and perform control/monitoring of system 100 using only the actual coke rate. Once the coke rate bias is determined, coke rate bias calculator 1004 provides the coke rate bias to adjusted coke rate calculator 1006. Adjusted coke rate calculator 1006 may simply combine the predicted coke rate with the coke rate bias to provide an adjusted coke rate to drum outage predictor 222.

In some embodiments, the bias is implemented after a predetermined period of time to account for a potential point source data error. For example, a typical issue that occurs in coke drums is the generation of foam that can potentially "foam-over" the lid of the drum. This phenomenon can occur both during filling and after the drum has been filled. In an exemplary embodiment, a foam-over can occur in fractionator 114. The reasons/causes of foam-overs within drums is variable, and can include a constant loss in drum pressure, a quick pressure drop (e.g., 1 psi in two minutes, etc.), a reduction in coke drum density, an open drain valve during the switching of drums, and others. As such, the point source data may indicate that the coke is at a certain level within the drum, when in reality the point source data is measuring the foam-over level, resulting in coke levels that are being measured higher than they really are. To solve this issue, coke rate bias calculator 1004 may wait a predetermined period of time (e.g., 5 minutes, 10 minutes, 15 minutes, 30 minutes, 1 hour, etc.) to implement the coke rate bias, to allow sufficient time for the foam to subside and see if lower coke levels are received from the point source data. If so, this can be an indication that there was a foam over and no (or less) bias is actually needed. If not, this can be an indication that the coke level determined by the point source data was relatively accurate, there was none or little foam-over, and the bias can be implemented accordingly. Various embodiments below describe biasing in greater detail.

Figure 11:
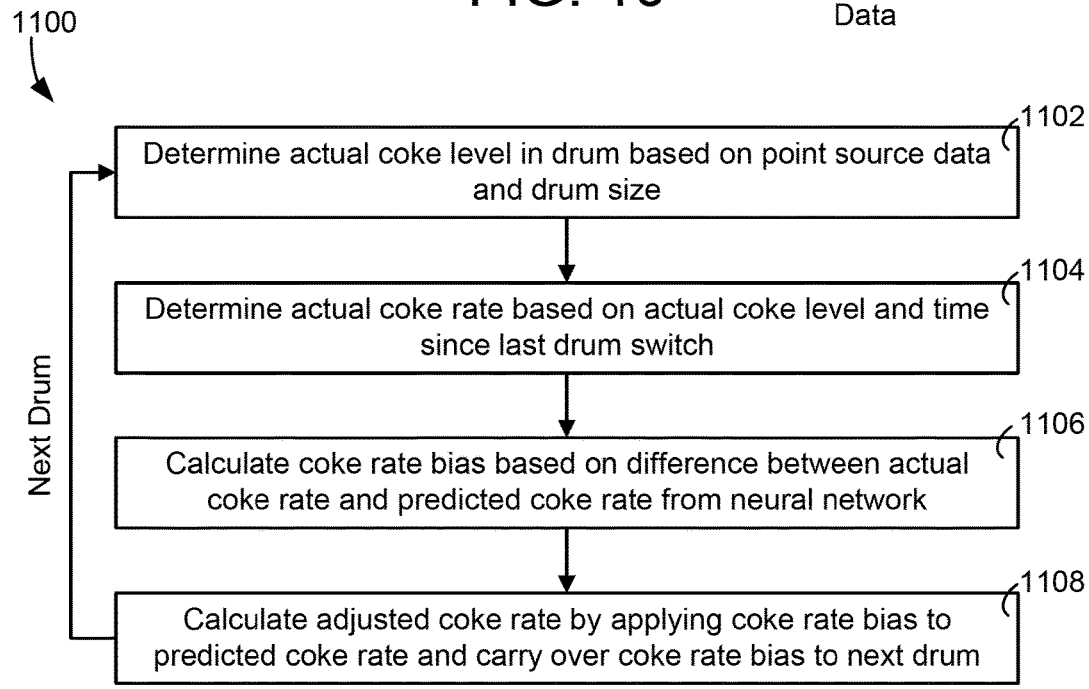
FIG. 11 is a flow diagram of a process for adjusting a coke rate with coke rate bias, which can be performed by the adjuster of FIG. 10, according to some embodiments.

Referring now to FIG. 11, a process 1100 for adjusting a predicted coke rate is shown, according to an exemplary embodiment. Process 1100 may be performed by coke rate adjuster 220 as shown in FIG. 10. Process 1100 is shown to be recurring, such that the predicted coke rate is constantly being adjusted (e.g., every clock cycle, every 10 milliseconds, every second, every minute, etc.).

Process 1100 is shown to include determining the actual coke level in the drum based on point source data and drum size (step 1102). This step can be performed by actual coke level calculator 1014. In some embodiments, the point source data is received from point sources 234. Point sources 234 may include various sensors or subsystems configured to provide density measurements and/or predictions for determining the coke level in the drum. While density is the general method for determining the coke level via the point source data, other attributes may be measured to determine the actual coke level. Actual coke level calculator 1014 may receive the point source data and drum size dimensions (e.g., via drum database 1012) to produce the actual coke level. This may be done by converting the point source data—which may indicate the density levels at specific points within the drum—into the coke level under the constraints of the drum size.

Process 1100 is shown to include determining the actual coke rate based on the actual coke level and time since the last drum switch (step 1104). In some embodiments, this step is performed by actual coke rate calculator 1010 as shown in FIG. 10. By combining the time in the drum (e.g., the time since the drum started generating coke) and the actual coke level, a rate between the coke level (height) and the time in the drum (time) can be determined.

Process 1100 is shown to include calculating the coke rate bias based on the difference between the actual coke rate and the predicted coke rate from the neural network (step 1106). In some embodiments, the predicted coke rate is determined by neural network model 216 and is provided to coke rate bias calculator 1004. Additionally, actual coke rate calculator 1010 determines the actual coke rate and provides the actual coke rate to coke rate bias calculator 1004. Coke rate bias calculator 1004 then determines an appropriate bias to provide to adjusted coke rate calculator 1006 that will adjust the predicted coke rate. In some embodiments, the appropriate bias is the difference between the predicted coke rate and the actual coke rate. In some embodiments, the bias is not initially implemented and a predetermined amount of time passes prior to implementing the coke rate bias in the event that the point source data was over-measuring the coke level due to foaming in the drum.

Process 1100 is shown to include calculating the adjusted coke rate by applying coke rate bias to the predicted coke rate and carry-over coke rate bias to the next drum (step 1108). This may be performed by adjusted coke rate calculator 1006 as shown in FIG. 10. Once adjusted coke rate calculator 1006 receives the coke rate bias, adjusted coke rate calculator 1006 may combine the coke rate bias with the predicted coke rate and provide an adjusted coke rate to drum outage predictor 222. Coke rate bias calculator 1004 and adjusted coke rate calculator 1006 may be combined into a single module for adjusting the coke rate based on a determined coke rate bias. Additionally, step 1108 shows an arrow back to step 1102, indicating that process 1100 is recurring, and that the predicted coke rate may consistently be adjusted based on the received point source data.

In a general embodiment, FIGS. 10-11 disclose systems and methods for adjusting a predicted coke rate based on data received on the density of the product within the drum. As the density of the product within the drum may indicate a different coke rate than one generated by a neural network trained with historical data, an adjustment may need to be made to account for the differences. However, both methods of determining are important and contribute to the accuracy of the coke rate. A predicted coke rate generated via neural network model 216 allows for numerous amounts of previously measured coke batches to aid in determining the general coke rate of the current batch. Additionally, various amounts of real-time system conditions can be provided to neural network model 216 such that current attributes regarding the batch (temperature, feed rate, etc.) can be combined with historical data to determine an accurate predicted coke rate. Conversely, the point source data provides important information relating to the density of the coke within the drum. Taking multiple point source data points over a period of time can provide a reasonably accurate indication of how quickly the coke is being generated within the drum. Advantageously, coke rate adjuster 220 combines both of these methods to provide a more accurate adjusted coke rate to drum outage predictor 222.

Drum Outage Predictor

Figure 12:
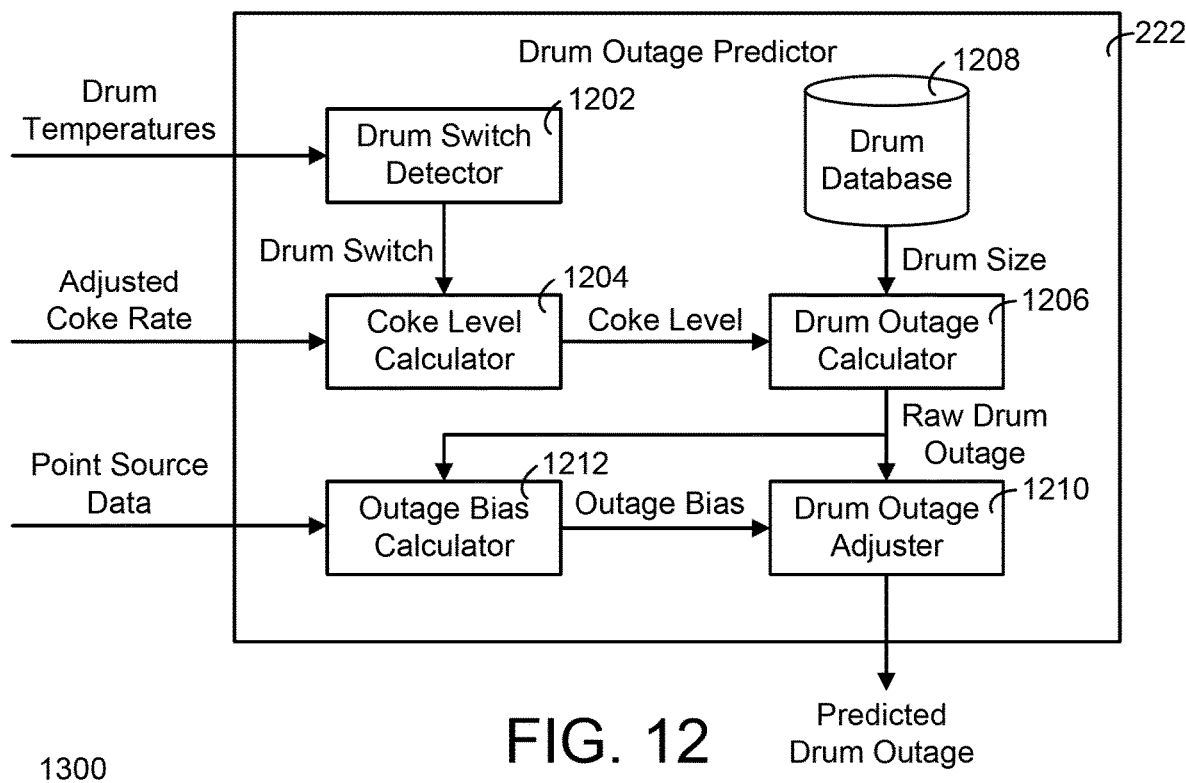
FIG. 12 is a block diagram of a drum outage predictor, which can be implemented by the controller of FIG. 2, according to some embodiments.

Referring now to FIG. 12, a detailed block diagram of drum outage predictor 222 is shown, according to exemplary embodiments. Drum outage predictor 222 can be configured to determine a predicted drum outage based on various predicted information (e.g., adjusted coke rate), real-time system conditions (e.g., drum temperatures, etc.) and point source data. Drum outage predictor 222 is shown to include drum switch detector 1202, coke level calculator 1204, drum outage calculator 1206, drum database 1208, drum outage adjuster 1210, and outage bias calculator 1212.

Drum switch detector 1202 is shown receiving drum temperatures and providing the drum switch information to coke level calculator 1204. This information can include determining the time since the last drum switch based on received drum temperatures. In some embodiments, drum switch detector 1202 is identical or substantially similar to drum switch detector 1002. Once the drum switch information is determined, drum switch detector 1202 provides the information to coke level calculator 1204. Coke level calculator 1204 receives the adjusted coke rate—which may be generated by the systems and methods disclosed above with reference to FIGS. 10-11—and drum switch information to determine the coke level within the drum. Coke level calculator 1204 provides the coke level to drum outage calculator 1206.

Drum outage calculator 1206 combines the coke level determined by coke level calculator 1204 with drum dimensions received by drum database 1208 to determine the raw drum outage. In some embodiments, the raw drum outage is calculated by subtracting the coke level from the drum size. For example, a drum having a size of 22 m and a current coke level of 21 m results in a calculated drum outage of 1 m In some embodiments, the adjusted coke rate is directly provided to drum outage calculator 1206 and combined with the drum size information to determine the raw drum outage. As referred to herein, the raw drum outage may simply represent the amount of space left within the drum before the drum is full of coke and/or coke vapor. The raw drum outage is provided to drum outage adjuster 1210 and outage bias calculator 1212.

Outage bias calculator 1212 uses the point source data and raw drum outage to determine an outage bias. The outage bias may be determined by outage bias calculator 1212 by calculating the difference between the raw drum outage and the drum outage indicated by the point source data. For example, the "4.6 m" point source sensor may be triggered at a given time, indicating that the current drum outage is 4.6 m at that time. However, the raw drum outage at that same time may be 12 m Accordingly, outage bias calculator 1212 may subtract the raw drum outage (12 m) from the drum outage indicated by the point source data (4.6 m) to calculate an outage bias of −7.4 m. The outage bias represents the amount by which the raw drum outage should be adjusted to match the outage level indicated by the point source data. Although a bias is implemented to determine the adjusted coke rate (as shown in FIG. 10), another bias may be implemented to the predicted drum outage (e.g., raw drum outage). Once determined, outage bias calculator 1212 provides the outage bias to drum outage adjuster 1210. Drum outage adjuster 1210 may simply combine the raw drum outage with the determined outage bias to generate a predicted drum outage for target coke rate calculator 214.

While some embodiments disclosed herein use historical point source data (e.g., coke rate adjuster 220, drum outage predictor 222, etc.) as an estimation for determining drum outage, other methods of determining drum outage may be considered. For example, system 200 may directly monitor drum outage in coke drum 116 via one or more sensors that directly measure the drum outage (e.g., one or more sensors 230, etc.). The sensors may be able to directly measure the drum outage based on volumetric properties, pressure, density, flow rate, gas rate, mass flow, force, viscosity, or other characteristics. In some embodiments, a combination of historical point source data and real-time measurements of drum outage are considered by controller 202 for determining control decisions.

Figure 13:
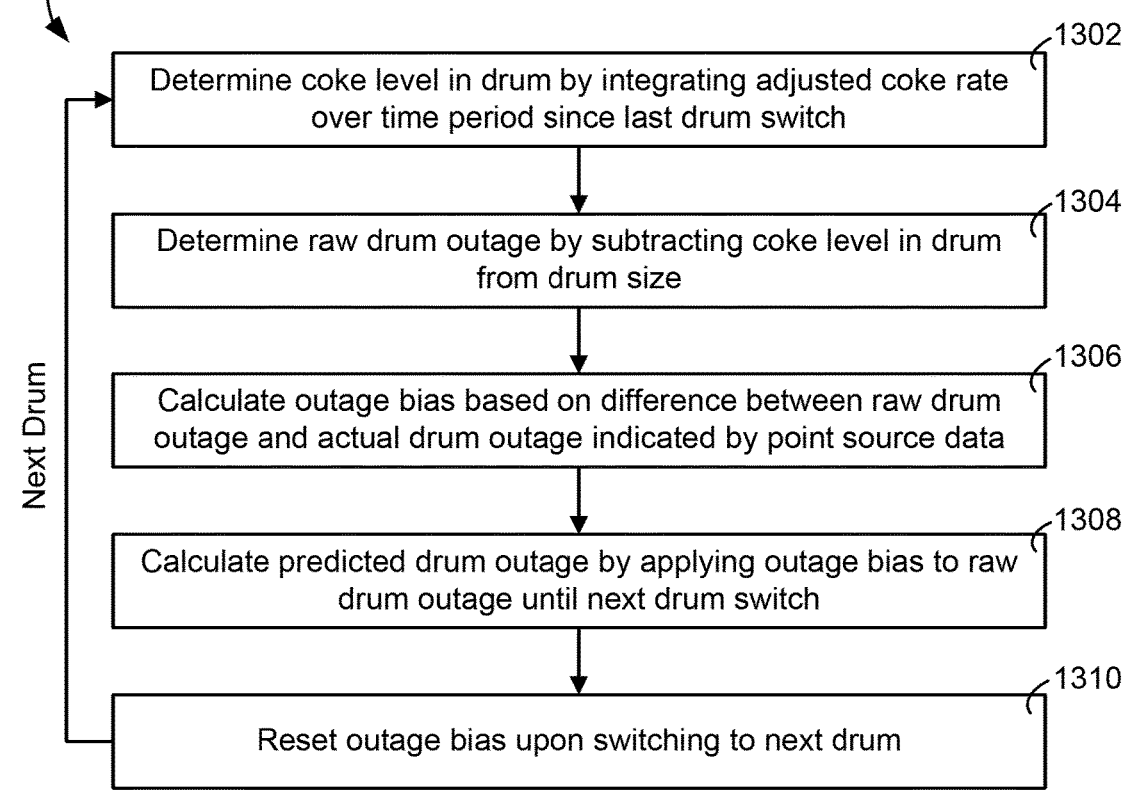
FIG. 13 is a flow diagram of a process for predicting the drum outage for a coke drum, which can be performed by the predictor of FIG. 12, according to some embodiments.

Referring now to FIG. 13, a process 1300 for adjusting a predicted drum outage is shown, according to exemplary embodiments. Process 1300 can be performed by drum outage predictor 22 as shown in FIG. 12. Process 1300 is shown to be recurring, such that once the final step is completed (step 1310), process 1300 returns to step 1302 to complete. This allows the drum outage to be constantly predicted based on the continually-received point source data, adjusted coke rate, and drum temperatures.

Figure 20:
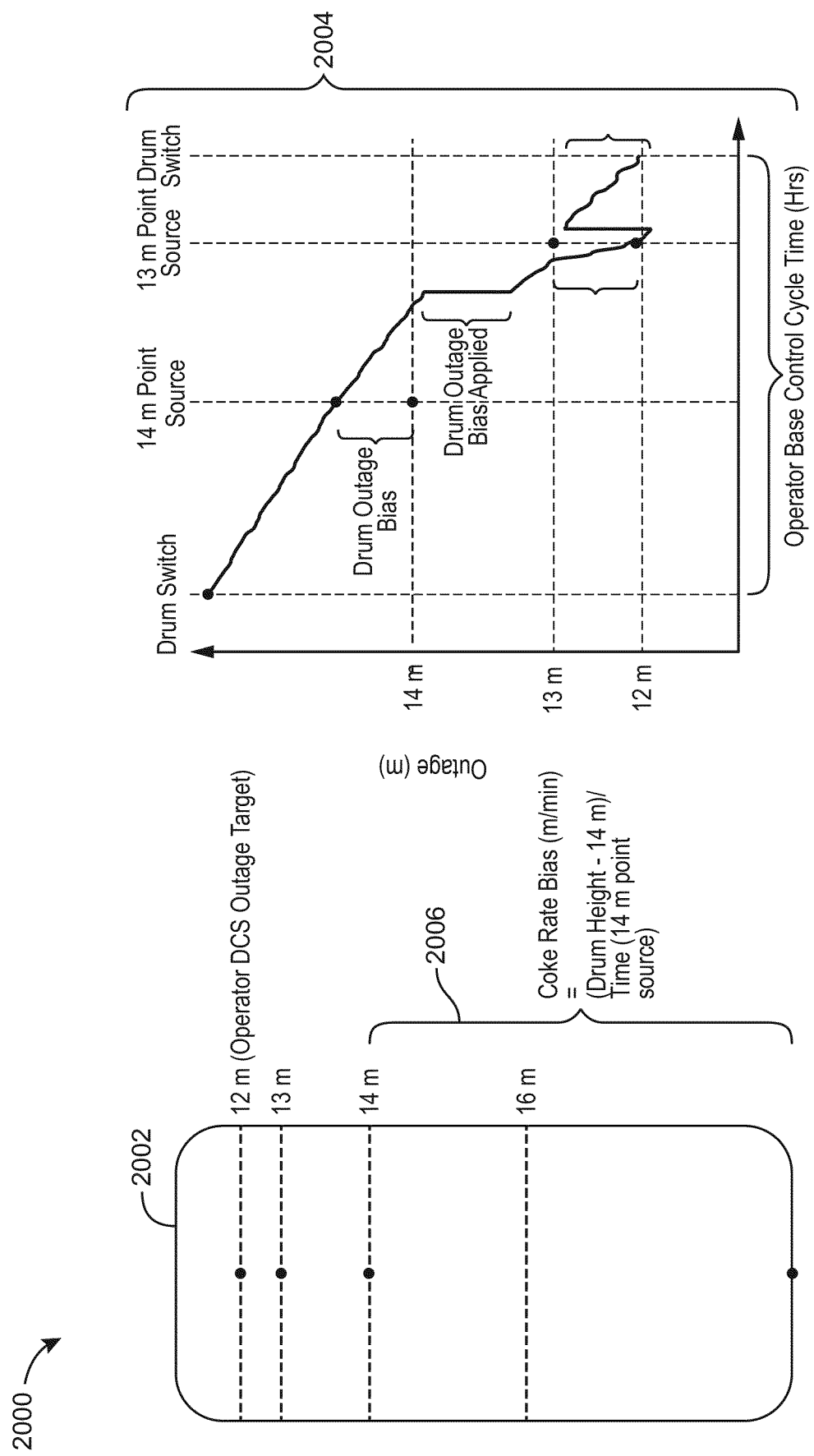
FIG. 20 is a diagram for determining the drum outage bias in a coke drum, which can be performed by the predictor of FIG. 12, according to some embodiments.

Process 1300 is shown to include determining the coke level in the drum by integrating the adjusted coke rate over the time period since the last drum switch (step 1302). An exemplary embodiment of this step is shown in FIG. 20 and described below in greater detail. Drum outage predictor 222 may determine the coke level in the drum by integrating the coke rate (e.g., ft./min, m/min, etc.) over the time during the drum cycle to determine the total drum outage.

Process 1300 is shown to include determining the raw drum outage by subtracting the coke level in the drum from the drum size (step 1304). In some embodiments, the raw drum outage is the drum outage value that has not been adjusted for bias. This may be determined by the drum outage predictor 222 receiving drum dimensions via drum database 1208, subtracting the coke level from the total size/height of the drum, and determining the drum outage. As such, the drum outage, or raw drum outage, is inversely related to the coke level within the drum.

Process 1300 is shown to include calculating the outage bias based on the difference between the raw drum outage and the actual drum outage indicated by the point source data (step 1306). In some embodiments, an outage bias needs to be calculated in case the drum outage level determined by the point source data is different than the drum outage determined by drum outage predictor 222. As discussed below, the typical process that has been described above generally refers to control logic implemented based on a neural net. As such, the drum outage bias may be a difference between the neural network drum outage and the drum outage determined by the point source data.

Process 1300 is shown to include calculating predicted drum outage by applying an outage bias to the raw drum outage until the next drum switch (step 1308). The outage bias may be applied to the raw drum outage to calculate a predicted drum outage. In some embodiments, this application is delayed to allow for determining whether the drum outage hitting specific markers in the drum (e.g., 4.6 m of drum outage, etc.) are false positives. As such, a time delay will be applied prior to applying the drum outage bias. Various examples of this are described below with reference to FIG. 23.

Process 1300 is shown to include resetting the outage bias upon switching to next drum (step 1310). Upon completion of a drum cycle, the outage bias will reset when the system switches over to filling the next drum. Process 1300 shows that step 1310 connects back to step 1302, indicating that this process can be repeated. In some embodiments, process 1300 is performed at every neural network step before, after, and/or during a drum cycle.

Coker Feed Rate Controller

Figure 14:
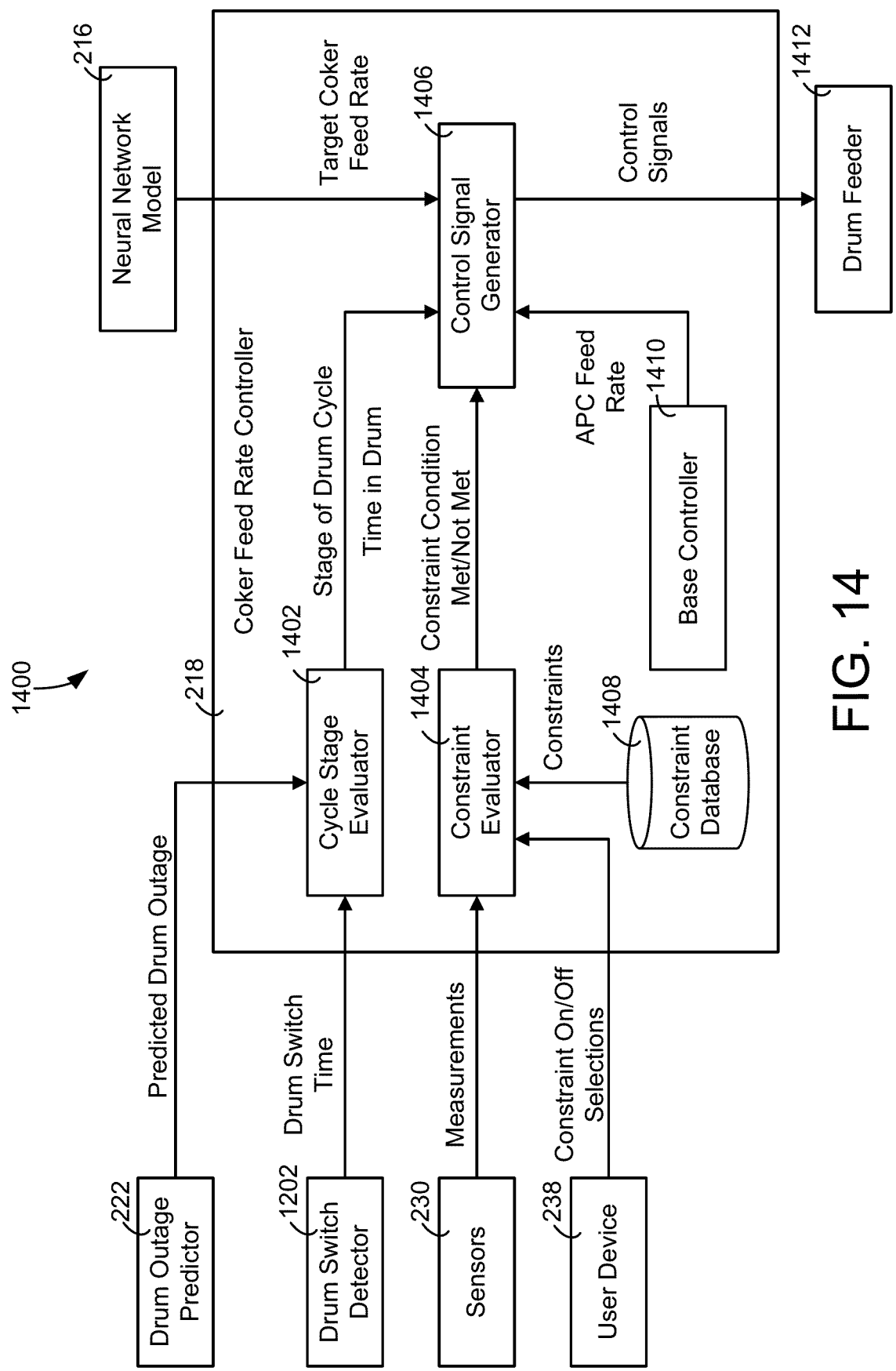
FIG. 14 is a block diagram of a coker feed rate controller, which can be implemented by the controller of FIG. 2, according to some embodiments.

Referring now to FIG. 14, a detailed block diagram of coker feed rate controller 218 is shown, according to exemplary embodiments. Coker feed rate controller 218 can be configured to control the operation of a feed (e.g., feed pump, amount of feed entering fractionator 114, etc.) by providing control signals to various components (e.g., valves 120, pump 122, etc.). Coker feed rate controller 218 is shown to include cycle stage evaluator 1402, constraint evaluator, control signal generator 1406, constraint database 1408, and base controller 1410.

Cycle stage evaluator 1402 can be configured to receive a predicted drum outage from drum outage predictor 222 and drum switch times from drum switch detector 1202. Based on this information, cycle stage evaluator 1402 may determine the current stage in the drum cycle. In a general embodiment, a drum cycle (e.g., a batch) may have various stages such that, when the drum cycle is in the particular stages, certain control actions are taken. For example, the first hour of the drum cycle may maintain a target feed rate established from the previous drum cycle, so as not to push the feed rate into new constraints in the present drum cycle. Once the first hour passes, coker feed rate controller 218 may then take in the present target coker feed rate and provide control signals based on the target coker feed rate. In another embodiment, the first hour of the drum cycle may maintain a predicted coke rate established from the previous drum cycle and make control decisions (e.g., operate the feed) based on the predicted coke rate from the previous drum cycle, so as not to push the feed rate into new constraints in the present drum cycle. Once the first hour passes, the present coker feed rate is used to make control decisions. Cycle stage evaluator 1402 can provide the current stage in the drum cycle and the time in the drum to control signal generator 1406. The above example is not limited to one hour intervals and various other time intervals (e.g., 2 hours, 5 hours, etc.) are considered.

Constraint evaluator 1404 can be configured to determine the constraints for operating drum feeder 1412. For example, if a user wants to operate drum feeder 1412 below a certain rate (e.g., 100 gpm, 1000 gpm, etc.), then constraint evaluator 1404 evaluates this constraint and determines whether the constraint has been met and provides the decision to control signal generator 1406. In some embodiments, if the constraint has not be met (i.e., satisfied), control signal generator 1406 may operate normally and provide control signals to drum feeder 1412. If the constraint has been met, this can affect the control signals sent to drum feeder 1412, as coker feed rate controller 218 does not want to provide control signals that will constrain the system. These affects can include mitigation controls to drum feeder 1412 or stopping operation of drum feeder 1412. In some embodiments, constraints are stored within controller 202 (e.g., within coker feed rate controller 218) in constraint database 1408 such that constraint evaluator 1404 can query constraint database 1408 to receive various constraints and evaluate whether they are being met.

Control signal generator 1406 can be configured to receive the stage of the drum cycle, time in the drum for the drum cycle, various constraints, and target coker feed rates received from neural network model 216 and determine control signals that satisfy the target coker feed rate. The control signals may include providing a control signal to an actuator or motor that opens/closes a feed to the drum (e.g., drum feeder 1412). Drum feeder 1412 may be located before any inlet to a drum configured to generate coke (e.g., fractionator 114) within system 100.

Base controller 1410 may be configured to provide base control of system 100 and various components therein. In some embodiments, base controller 1410 provides a base control feed rate to control signal generator 1406. This base control feed rate may be a target or predicted feed rate that was determined by base controller 1410. Base controller 1410 may perform different control schema and/or monitoring of system 100 and the various components therein than the systems and methods implemented by neural network trainer 212, target coke rate calculator 214, neural network model 216, coker feed rate controller 218, coke rate adjuster 220, or drum outage predictor 222. In a general embodiment, base controller 1410 performs base control, while controller 202 and the various controllers therein perform a method of control schema that utilizes a neural net (e.g., "the neural net"). The similarities and differences between these two control schema and how they work in conjunction within system 100 are disclosed in greater detail with reference to FIGS. 16-26.

As described herein, base control refers to a broad range of control techniques, control strategies, optimization techniques, and various technologies for controlling industrial process control systems. In some embodiments, base control, as performed by controller 202, coker feed rate controller 218, and/or base controller 1410, may include some or all functionality of a control schema known as Model Predictive Control (MPC). MPC may be a control strategy used to optimize a system based on changing a variety of variables and determining how that affects the system model. A high-level example of Model Predictive Control is described below.

The system model may include a variety of inputs, outputs, and associated objective function (e.g., an optimization equation). The MPC may begin with performing a simulation of the system by simulating multiple trajectories of the system inputs to optimize the objective function of the system model. This produces a model of the inputs over a period of time called the time horizon, the time horizon including several time steps distributed within (e.g., time horizon of 10 seconds with time steps at every second, etc.). The MPC may then only implement the first time step of the simulated inputs. In other words, a simulation to optimize control is run over many time steps, but only the first time step is implemented. The entire simulation to optimize control is re-ran over a new time horizon starting at the previously implemented time step, and the first time step of the newest simulation is implemented. This can allow the system to continuously re-optimize the control based on the newly implemented state. This process may be repeated to reach a desired output. In a general example of MPC that is void of any constraints, the control signal may be modeled as follows:

$$k(x_k) = u_{k+1}(x_k)$$

Where k is an control signal, $k(x_k)$ is the control signal at time $x_k$, u is the control signal over a set of inputs to the system, k+1 is a first time step starting from k, and $u_{k+1}$ is the optimal control for time step k+1, and $u_{k+1}(x_k)$ is the optimal short time control for time step k+1, starting at $x_k$.

In the above example, system identification may be used to generate detailed and complex models for various systems (e.g., linear, nonlinear, static, dynamic, etc.) that allow the MPC to accurately optimize continually. Additionally, MPC may impose constraints on various inputs into the system. Advantageously, this can allow the inputs to be modeled in a reasonable and realistic simulation such that step-by-step optimization can occur in accordance with the simulated optimization of inputs. The functionality of base control as disclosed herein may include several types and/or modifications of standard MPC, such as nonlinear MPC, linear MPC, explicit MPC, and robust MPC.

Figure 15:
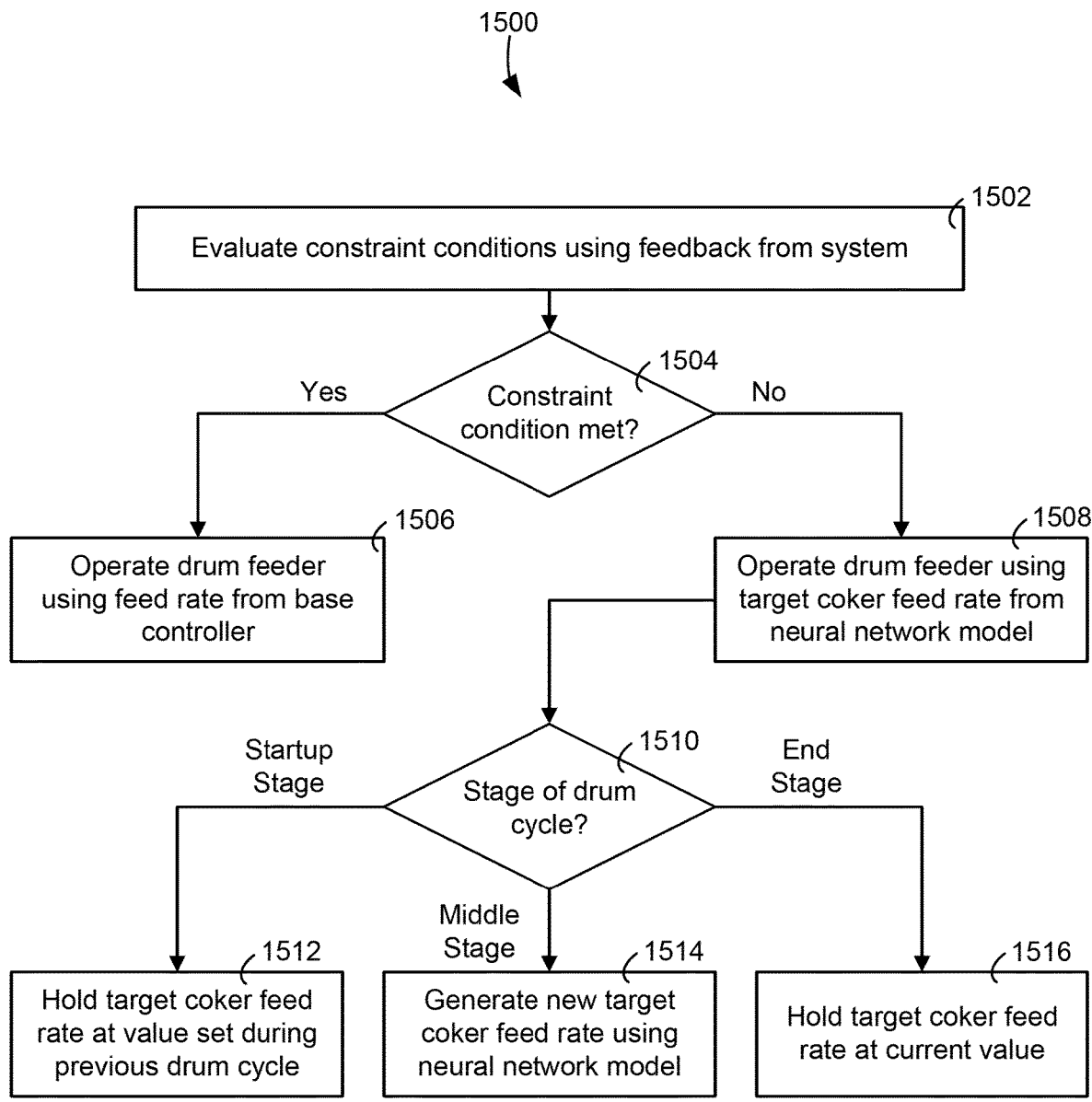
FIG. 15 is a flow diagram of a process for controlling a coker feed rate, which can be performed by the controller of FIG. 14, according to some embodiments.

Referring now to FIG. 15, a process 1500 for determining a control action based on whether or not constraints have been met within coker feed rate controller 218 is shown, according to exemplary embodiments. Process 1500 may be performed by various modules within coker feed rate controller 218, such as control signal generator 1406. In some embodiments, process 1500 acts as a process for implementing base control when a constraint has been met within coker feed rate controller 218. When the constraint has not been met, coker feed rate controller 218 maintains using the typical control schema (e.g., the neural network).

Process 1500 is shown to include evaluating constraint conditions using feedback from system 100 (step 1502). In some embodiments of this step, control signal generator 1406 and/or constraint evaluator 1404 evaluate the constraints received by sensors 230, user device 238, and/or constraint database 1408. In a general embodiment, constraints may include a predetermined threshold that, when met or crossed, indicates that a constraint has been met. For example, a temperature threshold may be implemented for the feed rate such that the feed is entering the drum at a high enough temperature. If the feed drops below this temperature, which may be determined by sensors 230, the constraint is met.

Process 1500 is shown to include determining whether the constraint has been met (step 1504). Step 1504 may be performed by control signal generator 1406. If control signal generator 1406 determines that a constraint has been met, control signal generator 1406 may generate control signals based on base control. This may include generating control signals based on the base control feed rate received by base controller 1410. For example, process 1500 operates drum feeder 1412 using the feed rate from the base controller (step 1506). In another embodiment, if control signal generator 1406 determines that a constraint has not been met, control signal generator 1406 may generate control signals based on the typical control operation, which can include the target coker feed rate from neural network model 216, and various information from cycle stage evaluator 1402 and constraint evaluator 1404. For example, control signal generator 1406 operates drum feeder 1412 using the target coker feed rate from neural network model 216 (step 1508).

Process 1500 is shown to include determining the stage of the drum cycle (step 1510). As discussed above with reference to FIG. 14, the control decisions may not only be based on the various constraints and whether they have been met, the control decisions may also be based on what stage of the drum cycle the batch is presently operating. Stages of the drum cycle may be separated by time or by outage levels. For example, the startup stage may be approximately the first hour of drum cycle operation. The middle stage may be time after the startup stage until 1.22 m from the outage target is reached. The end stage may be the last 1.22 m until the outage target is reached. These stages are meant to be exemplary and various thresholds for determining the stages may be considered. An exemplary embodiment of control actions based on different stages of the drum cycle is shown in greater detail with reference to FIG. 16 below.

Process 1500 is shown to include holding the target coker feed rate at the value set during the previous drum cycle (step 1512). In some embodiments, coker feed rate controller 218 may not want to implement the control actions based on the target coker feed rate of the immediate drum cycle, in the event that undetermined constraints are being met. In an exemplary embodiment, the constraints for the present drum cycle may take a certain amount of time to determine such that the some or all of the constraint decisions for the present drum cycle are indeterminate during the startup stage. Accordingly, the previous cycle's target coker feed rates may be used.

Process 1500 is shown to include generating a new target coker feed rate using neural network model 216 (step 1514). Once the startup stage has ended, the new target coker feed rate may be used to determine control actions. This middle stage of the drum cycle may be most of the drum cycle (e.g., 60%, 70%, 80%, etc.) and is where both the neural network and base control can be implemented. During the middle stage, processing of controller 202 is implementing normally without holds on the feed rate or any other manipulated variable.

Process 1500 is shown to include holding the target coker feed rate at the current value (step 1516). The end stage of the drum cycle can be the last portion of the drum cycle prior to switching over to the next drum. During this stage, the target coker feed rate determined from the nearly-finished drum cycle is maintained at the current value as was determined in the middle stage. In some embodiments, this is done to prevent any unanticipated constraints that may occur near the end of the cycle (e.g., incorrect drum outage prediction, foam-over potential, etc.). As such, the target coker feed rate is maintained at a constant value throughout the end stage. In other embodiments, the end stage includes little or no hold on the target coker feed rate.

Neural Net Control Schema
Neural Net-Base Control

Referring generally to FIGS. 16-21, various embodiments are shown of implementing the neural net, base control, or, at times, a combination of both, according to exemplary embodiments. The neural net, as referred to herein, may refer to the various control circuitry that implements the control logic of the various modules in controller 202. For example, text box 1604 in FIG. 16 states, ". . . the neural net will calculate the required coke rate to achieve the desired drum outage goal." This can refer to target coke rate calculator 214 or other components of controller 202.

Coke Rate Control Diagrams

Figure 16:
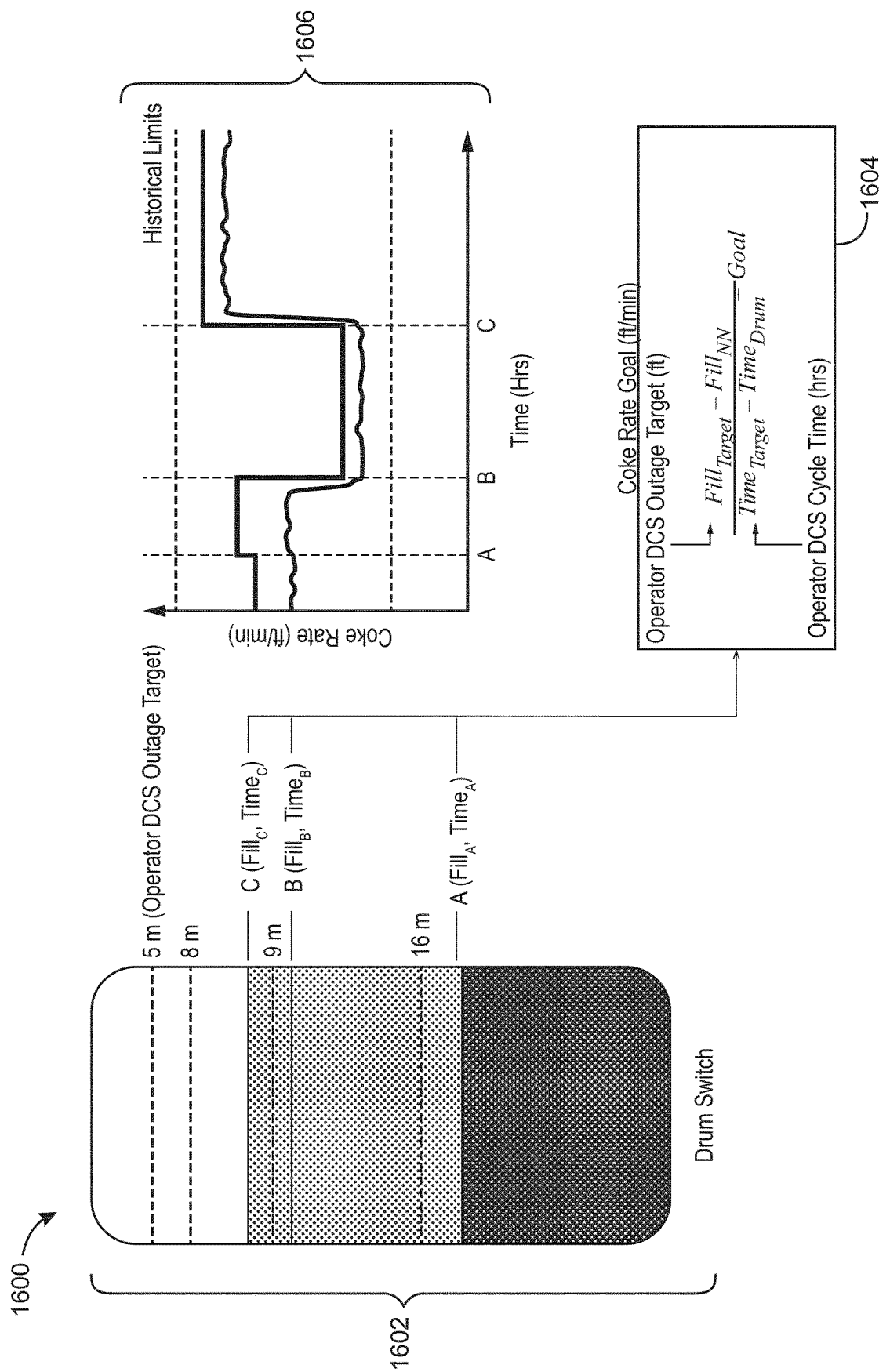
FIG. 16 is a diagram of determining a target coke rate, which can be performed by controller of FIG. 2, according to some embodiments.

Referring now to FIG. 16, a diagram 1600 for determining a coke rate goal is shown, according to exemplary embodiments. As referred to herein, a coke rate goal may be identical or substantially similar to the target coke rate determined by target coke rate calculator 214. The coke rate goal may be determined after every neural network step. In some embodiments, it used the operator base control inputs for outage target and cycle time and continually recalculates the predicted drum outage and cycle time.

In some embodiments, the coke rate goal (e.g., the target coke rate, etc.) cannot be set outside of an historical coke rate range. The historical coke rate range may include some or all of the previous drum cycle information relating to the range of coke rate values. For example, the historical coke rate range may be 0.08-0.11 m/min. This may be implemented to prevent the neural network chasing significantly large coke rate goals which can induce a significantly large feed rate. Diagram 1700 is shown to include drum diagram 1602, equation 1604, and graph 1606.

Drum diagram 1602 may show the various drum outage levels for generating equation 1704. Drum diagram 1602 shows the drum filling up to three distinct fill levels (Fill A at Time A, Fill B at Time B, and Fill C at Time C). These levels are shown on graph 1606. The coke rate goal and coke rate are shown on graph 1606 as they progress through a drum cycle that crosses the three distinct fill levels. These data lines are maintained within the limits of the historical coke rate range. The coke rate goal is determined based on equation 1604. Equation 1604 is provided below:

$$\frac{\text{Fill}_{Target} - \text{Fill}_{NN}}{\text{Time}_{Target} - \text{Time}_{Drum}} = \text{Goal}$$

Where $\text{Fill}_{Target}$ is the target fill level (i.e., drum size minus outage target), $\text{Fill}_{NN}$ is the current coke level calculated by controller 202 (e.g., the neural network), $\text{Time}_{Target}$ is the target duration of the drum cycle, $\text{Time}_{Drum}$ is the amount of time elapsed since the beginning of the drum cycle, and Goal is the calculated coke rate goal. Alternatively, the numerator of equation 1704 can be replaced with "$\text{Outage}_{NN}$–$\text{Outage}_{target}$" where $\text{Outage}_{NN}$ is the current drum outage calculated by controller 202 and $\text{Outage}_{target}$ is the target drum outage. Either formulation of equation 1704 results in the numerator indicating the amount of remaining space to be filled in the drum. In some embodiments, the $\text{Fill}_{Target}$–$\text{Fill}_{NN}$ portion of the equation is in units of meters (m) and the $\text{Time}_{Target}$–$\text{Time}_{Drum}$ portion of the equation is in units of minutes (min), yielding a coke rate in meters/minutes (m/min).

Figure 17:
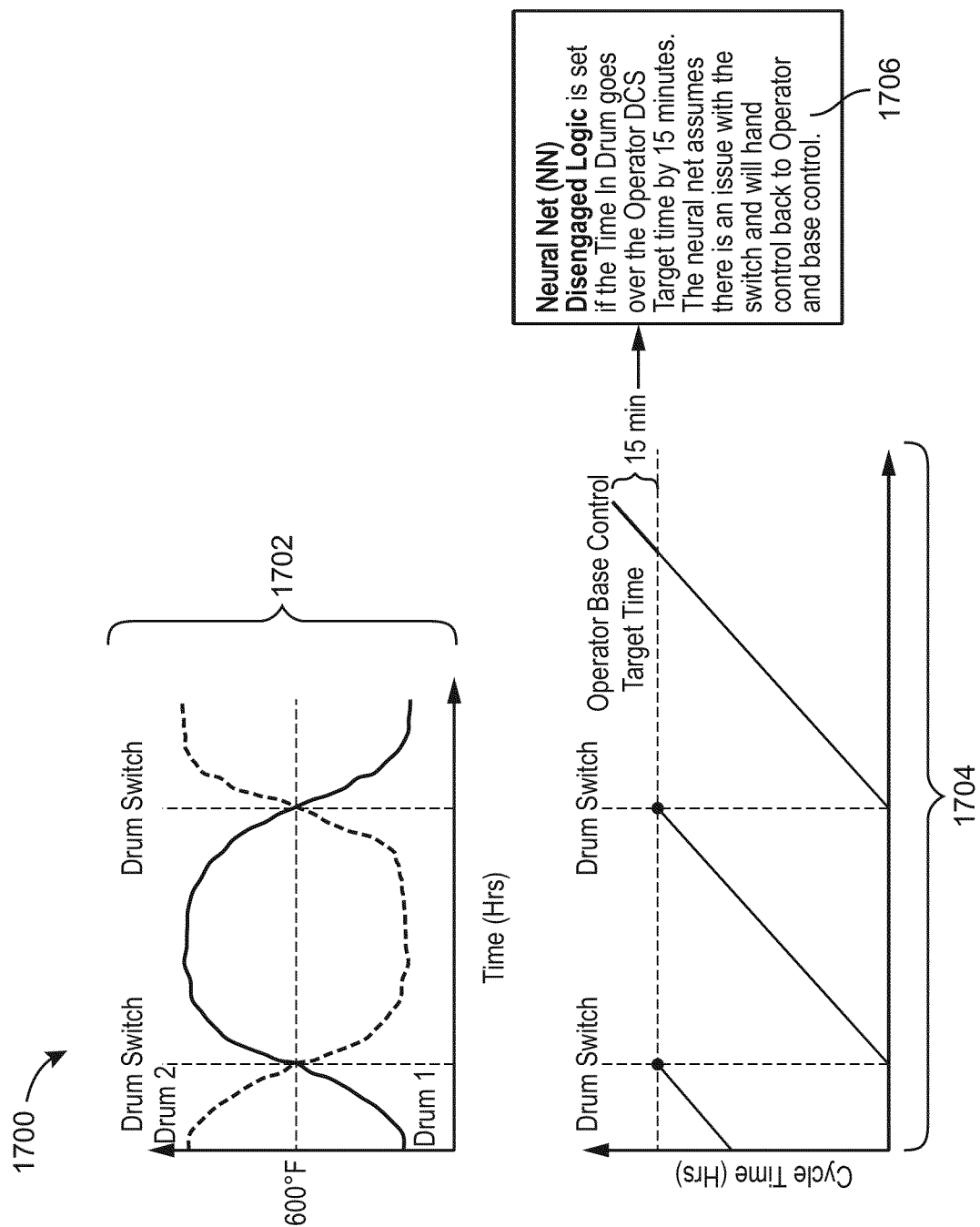
FIG. 17 is a diagram of determining the time in a drum for a drum cycle, which can be performed by the predictor of FIG. 12, according to some embodiments.

Referring now to FIG. 17, a diagram 1700 for determining the time in drum is shown, according to exemplary embodiments. The various processes disclosed with reference to FIG. 17 may be performed by drum outage predictor 222 as shown in FIG. 12, coke rate adjuster 220 as shown in FIG. 10, or neural network trainer 212 as shown in FIG. 9. In some embodiments, the "time in drum" is the amount of time that the current drum cycle has been operating since the last drum switch. Diagram 1700 includes graphs 1702, 1704 and text box 1706.

Graph 1700 discloses the drum switch times at various temperatures. Graph 1702 shows two lines, one for drum 1 (e.g., drum 116) and one for drum 2 (e.g., drum 118). Graph shows the temperature increase of drum 1 to 600° C. and the temperature decrease of drum 2 to 600° F. until they converge at 600° F. Once this occurs, a drum switch is implemented such that the temperature of drum 1 continues to increase and the temperature of drum 2 continues to decrease. Eventually the temperatures converge to 600° F. at another drum switch, and the process repeats itself. In various embodiments, the temperature at which the drum switch is implemented may be 700° F. or various other temperatures.

Graph 1704 shows the cycle time over a time period of at least two drum switches. A drum switch occurs when the target time is reached. Text box 1706 shows that a control action is performed if the time in drum goes over the target time by 15 minutes. Specifically, text box 1706 states, "The neural network DISENGAGED LOGIC is set if the Time In Drum goes over the operator base control target time by 15 minutes. The neural network assumes there is an issue with the switch and will hand control back to operator and base control." The threshold of 15 minutes for going over the target time is shown to be exemplary and can be any amount of time. Text box 1806 indicates that in the event that the time has gone over the target time by 15 minutes, base control takes over control and performs, controls, and monitors controller 202 or various components therein.

Figure 18:
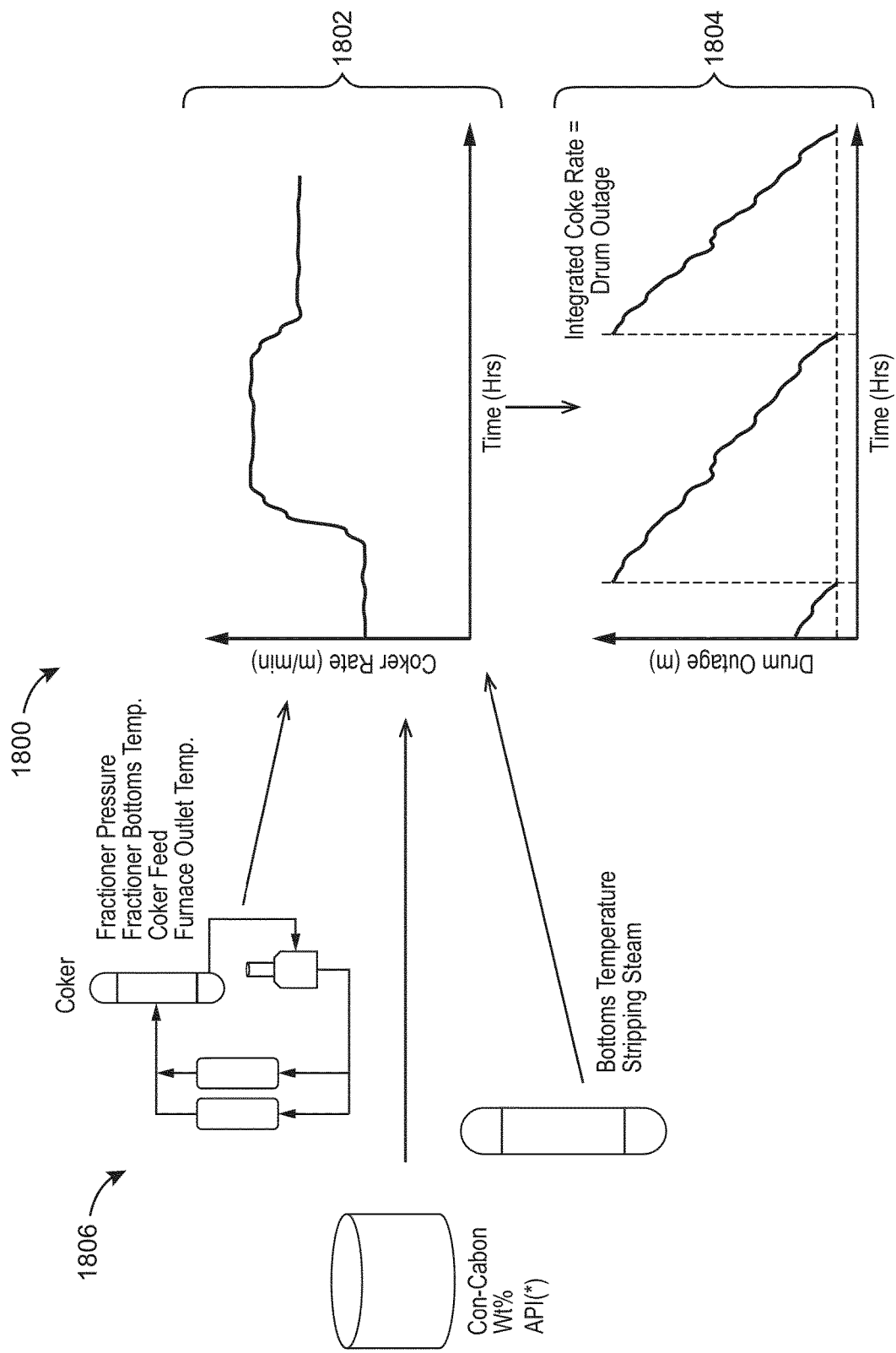
FIG. 18 is a diagram for determining a predicted coke rate, which can be performed by the controller of FIG. 2, according to some embodiments.

Referring now to FIG. 18, a diagram 1800 for determining a coke rate inferential is shown, according to exemplary embodiments. As described herein, coke rate interferential can be the amount of coke potentially present in the coker feed at any given moment. Coke rate inferential may be identical or substantially similar to the predicted coke rate as determined by neural network model 216 as shown in FIG. 7. Diagram 1800 is shown to include system 1806 including a crude oil feed, coker subsystem and a vacuum tower. Diagram 1800 further shows graph 1802 of coke rate vs. time and graph 1804 of drum outage vs. time.

System 1806 may be configured to determine a target coke rate via neural network model 216. For example, using variables from the crude oil feed, vacuum tower, and the coker subsystem (e.g., fractionator pressure, fractionator bottoms temperature, coker feed, furnace outlet temperature, etc.), a non-linear neural network coke rate inferential was developed. In some embodiments, the neural network is trained to control the coke rate with the coker feed rate. Graph 1802 represents this, where the coke rate inferential (e.g., target coke rate) is shown to vary over a period of time. Graph 1804 shows a respective drum outage vs. time graph of the coke rate inferential of graph 1802. As the drum outage reaches a minimum (e.g., 1 m., 2 m., etc.) the drum switch occurs and the drum outage begins at a maximum. In some embodiments, the drum outage is determined by integrating the coke rate over the time interval.

Coke Rate Bias Diagrams

Figure 19:
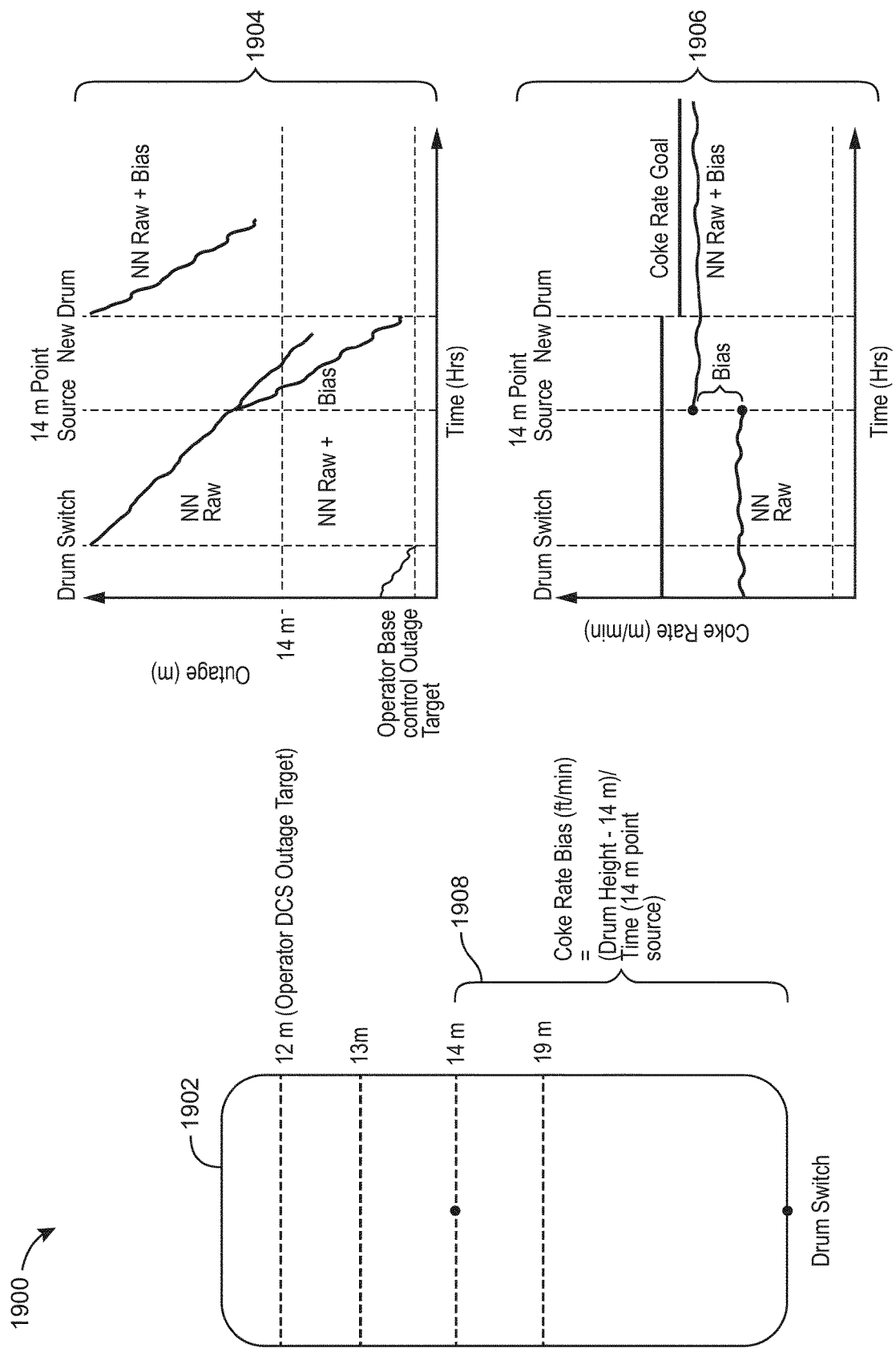
FIG. 19 is a diagram for determining a coke rate bias, which can be performed by the adjuster of FIG. 10, according to some embodiments.

Referring now to FIG. 19, a diagram 1900 for determining coke rate bias is shown, according to exemplary embodiments. The processes described in diagram 1900 may be performed by various components within controller 202, such as coke rate adjuster 220. As discussed above at two different types of biases may be considered within controller 202: drum outage bias and coke rate bias. In a general embodiment, the predicted coke rate is combined with an "actual" coke rate determined via a point source (e.g., 14 m point source as shown by drum diagram 2102). Diagram 1900 is shown to include drum diagram 1902, graphs 1904, 1906, and coke rate bias 1908.

Drum diagram 1902 shows an exemplary drum with outage levels and various point sources 234. Diagram 1902 shows the operator base control outage target at 12 m, with a point source at 14 m. In some embodiments, the coke rate is shown to be calculated by the equation provided below:

$$\text{Coke Rate}\left(\frac{m}{min}\right) = \frac{h_{drum} - 14\ m}{\text{time}_{14\ m}}$$

Where $h_{drum}$ is the height of the drum and $\text{time}_{14\ m}$ is the time at the 14 m point source. For example, at a drum height of 20 m and a time at the 14 m point source of 7.5 hours (450 min.), the coke rate bias would be:

$$\frac{20\ m - 14\ m}{450\ \text{min.}} = 0.013\left(\frac{m}{min}\right)$$

In some embodiments, the coke bias would then be calculated by calculating the difference between the predicted coke rate and the actual coke rate, as described with reference in FIGS. 10-11.

In some embodiments, the coke rate inferential is trained from the bottom of the drum to the 4.6 m point source. Therefore, any foam detection logic (e.g., an indication that foam is occurring), the coke rate bias will be applied. In some embodiments, the coke rate bias is carried into the next drum, unlike the fill bias (e.g., drum outage bias) that may get reset after every drum switch. Advantageously, this allows the neural network (e.g., neural network model 216, neural network trainer 212) to learn from every drum cycle.

Figure 21:
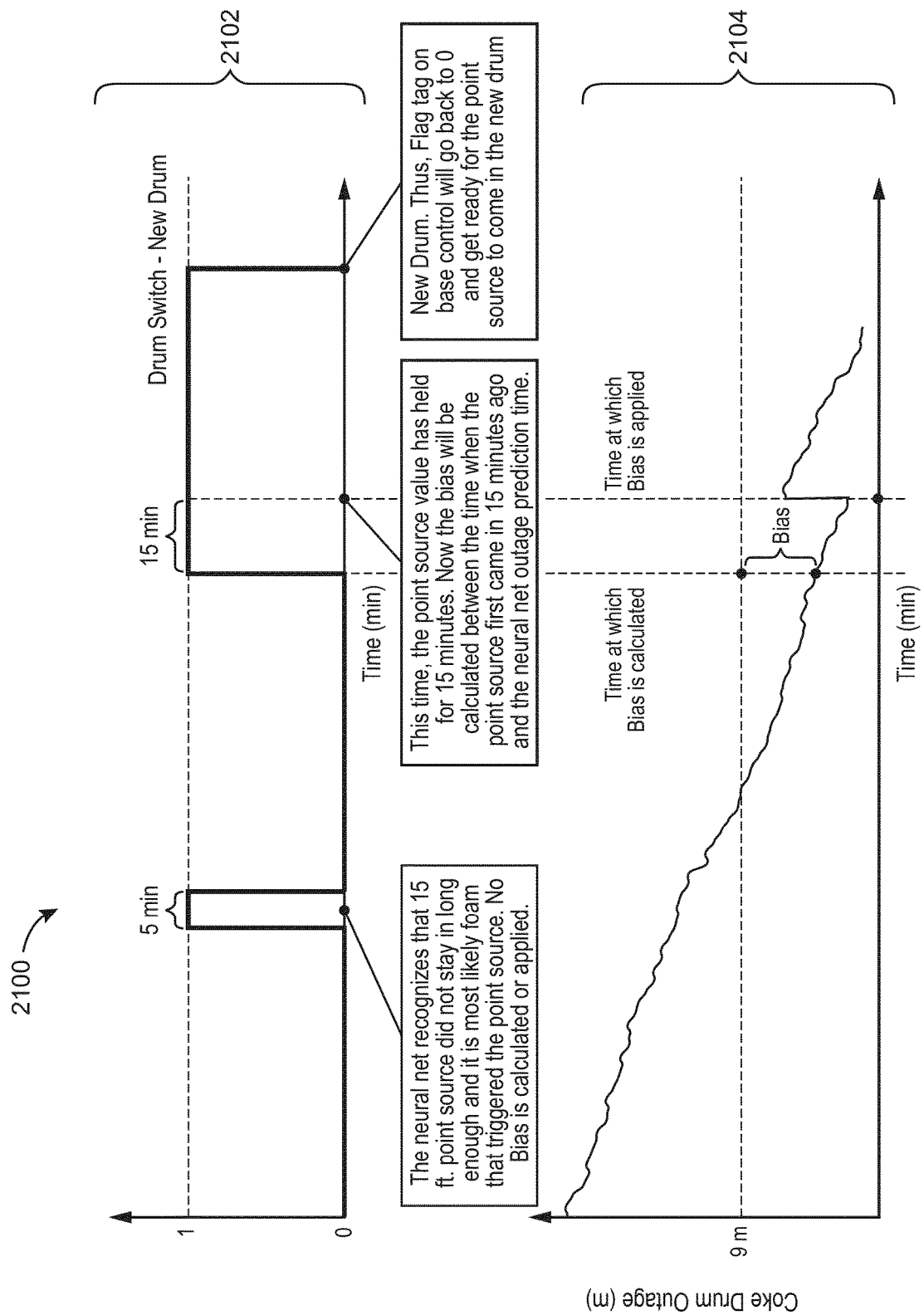
FIG. 21 is a diagram for implementing drum outage bias in a coke drum, which can be performed by the predictor of FIG. 12, according to some embodiments.

Still referring to FIG. 21, graph 1904 shows the drum outage in feet over a period of at least two drum switches in hours. Graph 1904 begins with the drum outage reaching a minimum, indicating the drum cycle has completed. After the drum switch occurs, the outage level reverts back to a maximum and begins to decrease. During this period, no bias has been induced and the outage level remains unadjusted. Once the outage level reaches the 14 m point source, the coke rate bias is induced, lowering the adjusted drum outage level from the original level.

Graph 1904 represents a similar timeline for coke rate bias. Graph 1904 shows the coke rate in m/min over a period of at least two drum switches in hours. The coke rate goal (e.g., target coke rate) is established. The actual coke rate operates normally until reaching the 14 m point source. At this point, a bias may be applied based on a difference between the predicted coke rate determined from neural network model 216 and the actual coke rate determined from the point source data. Graph 1904 shows the coke rate bias added to the predicted coke rate to create an adjusted coke rate.

Drum Outage Bias Diagrams

Referring now to FIG. 20, a diagram 2000 for implementing drum outage bias is shown, according to exemplary embodiments. The processes described with reference to diagram 2002 may be performed by various components of controller 202, such as drum outage predictor 222. In some embodiments, drum outage bias is calculated using foam-detection bias rules (e.g., control logic performed in outage bias calculator 1212) to bias the neural network predicted drum outage. This may be done by taking the difference between the neural network predicted drum outage and the drum outage determined by various point source data. In a general embodiment, any point throughout the drum cycle may be the point source indicator where biasing will occur, but 8 m and 16 m point sources may be preferred. Diagram 2300 is shown to include drum diagram 2302 and graph 2304.

Drum diagram 2002 shows various point sources at 12 m, 13 m, 14 m, 16 m and maximum height. Graph 2004 shows the drum outage from maximum to 12 m throughout a drum cycle. At the top-left of graph 2004, a drum switch occurs and the drum outage begins at the maximum amount. The drum outage steadily decreases until a 14 m point source is hit. Once the drum outage level hits 14 m via the 14 m point source a delay period occurs to determine whether the indication that coke has been generated up to 14 m of drum outage (i.e., the 14 m point source was reached) is true, or if it was a false positive. In some embodiments, a false positive may include reaching a point source with foam, rather than coke. As the coke drum begins to fill up with solid coke, the liquid level and the foaming head are pushed up. If left unchecked, the foam can reach near the top of the coke drum and potentially exit the drum, or "foam-over".

In the case of a foam-over, hydrocarbons can be carried overhead and foul transfer lines from the coke drum to the fractionation drum (e.g., fractionator 114), and the suction screens of the bottom of fractionator 114 can become plugged. The finer particles of coke that pass through the suction screens can deposit in the furnace heater tubes and result in severe fouling. In some embodiments, the foam-over event can also lead to excess silica downstream, potentially poisoning various hydrodesulphurization (HDS) catalysts. Therefore, proper application of the antifoam can be critical in coke production. In most coke production systems and applications, various anti-foaming chemicals are supplied to limit foam-overs.

In the present embodiment, the delay period may be sufficient to allow a time period for which the foam can subside. In the event that excess foam set off the trigger (e.g., a flag of the 14 m point source) for the 14 m point source, the delay period will follow. During the delay period (e.g., 10 min., 15 min., 20 min., etc.), the raw (i.e., unbiased) drum outage will still be considered for processing in the neural network. Once the delay period ends, and the foam has subsided, the 14 m point source should no longer be triggered. As such, a bias will be added to the drum outage level. As shown in graph 2004, the drum outage bias is applied after the delay period after hitting the 14 m point source. In this case, the neural network prediction (i.e., raw drum outage) was greater than that 14 m point source prediction. As such, the bias added to the raw drum outage lowered the value to increase accuracy. This process is shown to reoccur at the 13 m point source. In this case, the raw drum outage was less than the 13 m point source prediction. As such, the bias added to the raw drum outage raised the value to increase accuracy.

In some embodiments, another set of drum outage logic (e.g., the neural network disengaged logic) is set if the drum outage bias is greater than the largest acceptable error (e.g., 0.91 m, etc.). In some embodiments, this bias should be reviewed before engaging the neural network again. In some embodiments, the notification for engaging the neural network disengaged logic will show on a neural network application (e.g., web application, phone application, etc.).

Referring now to FIG. 21, a diagram 2100 for determining foam detection logic is shown, according to exemplary embodiments. In some embodiments, controller 202 contains control logic for incorporating the logic within the point source tags in addition to a time validation (e.g., a time delay, etc.) to ensure that the point sources are met. The neural network recognizes that the 9 m point source did maintain a signal indicating that coke has reached the 9 m point source for an acceptable amount of time. As such, no bias is applied. After a subsequent period of time, the 9 m point source is engaged for a much longer period of time (i.e., greater than 15 min.). As the exemplary embodiment has implemented a threshold at 15 min. for coke reaching the 9 m point source, the second time the 9 m point source is reached, it surpasses this threshold. Accordingly, the bias is applied, as shown in graph 2404. The processes disclosed with reference to FIG. 24 may be performed by various components within controller 202, such as drum outage predictor 222. Diagram 2400 is shown to include graph 2102 and graph 2104.

Graph 2102 shows a logic diagram for engaging a flag for a 4.6 m point source. In a general embodiment, a flag is a value that acts as a signal for a function or process, where the value of the flag is used to determine the next step of a program. Generally, flags are often binary flags, which contain a Boolean value (true or false). Graph 2402 shows two distinct logical jumps, one near the beginning of graph 2102 that lasts for a total of 5 minutes, and one later in graph 2404 that lasts for a period greater than 15 minutes. In some embodiments, the first time period of the first logical jump from 0 to 1 is time t0, the jump 5 minutes later from 1 to 0 is time t1, the logical jump from 0 to 1 of the second logical jump is time t2, and the jump a time greater than 15 minutes back down to 0 is t3. With regards to the first logic jump (t1) at the 5 min. mark for the 4.6 m point source of graph 2402, the neural network recognizes that the 4.6 m point source did not stay in long enough and it can most likely be inferred that foam that triggered the point source. Accordingly, no bias is calculated or applied. However, once a time period of 15 min. occurs (t3-t4) for the 4.6 m point source flag (e.g., the second logic jump), the point source value has held for 15 minutes. Once it has been determined that the 4.6 m point source flag is not a false positive (because the point source flag has remained true for a given amount of time), the bias is calculated based on the value of the predicted drum outage at the time t3 at which the 4.6 m point source flag was first triggered. For example, the predicted drum outage is shown as having a value of 3.96 m at time t3, which is 0.61 m less than the drum outage indicated by the 4.6 m point source at that time. Accordingly, a drum outage bias of −0.61 m is calculated and applied. Because the drum outage bias is not applied until it has been confirmed that the 4.6 m point source flag is not a false positive, the drum outage bias is not applied until time t4. In the present embodiment, once a drum switch occurs, the flag will go back to 0 and get ready for the point source to come in the new drum.

Graph 2104 shows a respective coke drum outage vs. time relationship over the same period of time as shown in graph 2102. In graph 2104, the coke drum outage steadily decreases as the coke drum fills up. Once the bias is calculated at the 15 min. mark of the 4.6 m point source (first dashed line), the coke drum outage continues to steadily decrease without an applied bias. Once the time delay is complete, the bias is applied. The coke drum outage increases in value as the bias was positive, indicating that the neural network-predicted drum outage was lower than the drum outage predicted by the 4.6 m point source. Accordingly, the coke drum outage steadily decreases after increasing in value from a jump where the bias is applied.

In some embodiments, the point source flags are for the neural network, base control, or both. In some embodiments, the tags will identify which drum is online and wait for the point source to be over a predetermined percentage (e.g., 30%, 40%, etc.) before activating the neural network flag. In some embodiments, the flags are designed for 16 m, 9 m, 8 m, and 4 m outage levels.

Neural Network Processes

Figure 22:
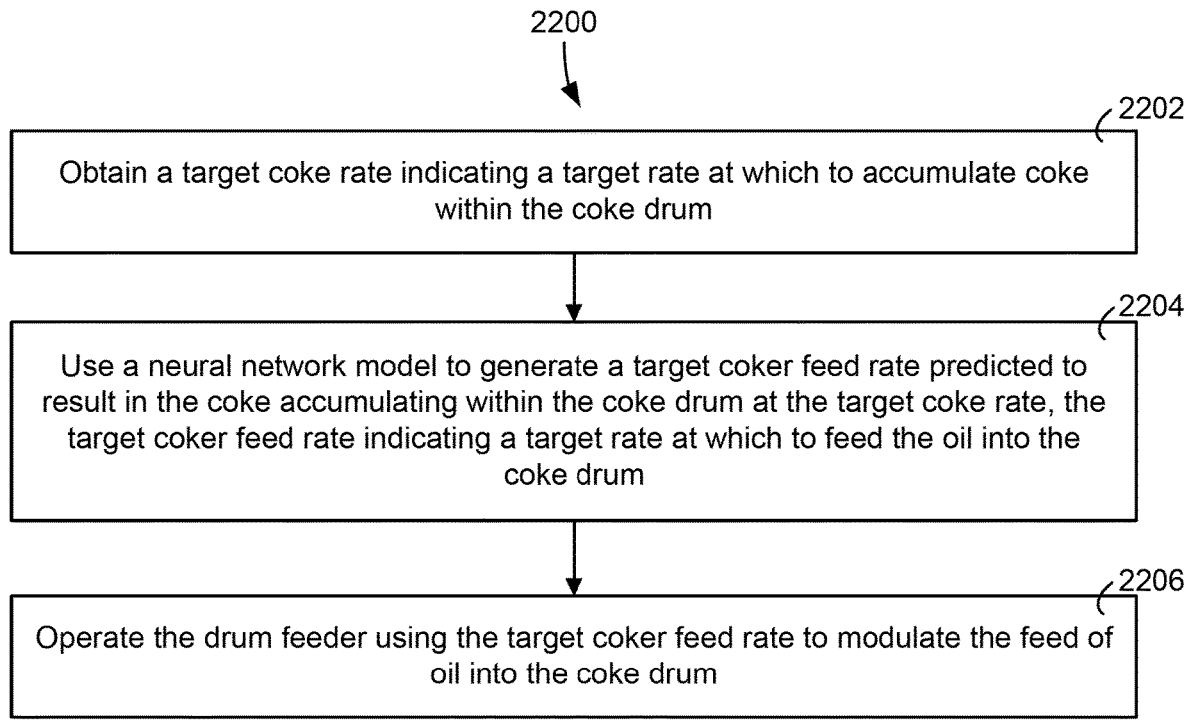
FIG. 22 is a flow diagram of a process for determining and implementing a target coker feed rate to satisfy a target coke rate, which can be performed by the controller of FIG. 2, according to some embodiments.

Referring now to FIG. 22, a process 2200 for operating a drum feeder based on a predicted coke rate is shown, according to exemplary embodiments. Process 2200 may be performed by any components within controller 202 described herein. In some embodiments, process 2200 acts a general process for implementing a neural network within an oil refinery control system.

Process 2200 is shown to include obtaining a target coke rate indicating a target rate at which to accumulate coke within the coke drum (step 2202). In some embodiments, neural network model 216 receives a target coke rate from target coke rate calculator 214. Neural network model 216 may use the target coke rate combined with learned weights received from neural network trainer 212 to determine either a target coker feed rate and/or a predicted coke rate.

Process 2200 is shown to include using a neural network model to generate a target coker feed rate predicted to result in the coke accumulating within the coke drum at the target coke rate, the target coker feed rate indicating a target rate at which to feed the oil into the coke drum (step 2204). In some embodiments, neural network model 216 generates a target coker feed rate that will satisfy the target coke rate. This can be based on additional factors than just the feed capacity. User constraints, temperature constraints, drum size, crude oil attributes, and various other features can affect the accuracy of the target coker feed rate.

Process 2200 is shown to include operating the drum feeder using the target coker feed rate to modulate the feed of oil into the coke drum (step 2206). Controller 202 may operate drum feeder 1412 in accordance with the target coker feed rate generated by neural network model 216. In some embodiments, other factors need to be taken into account prior to operating drum feeder 1412. Particularly, other factors, such as stage in the drum cycle, various constraints and whether they have been met, base control constraints, and base control feed rates may impact the control signals provided to drum feeder 1412.

Figure 23:
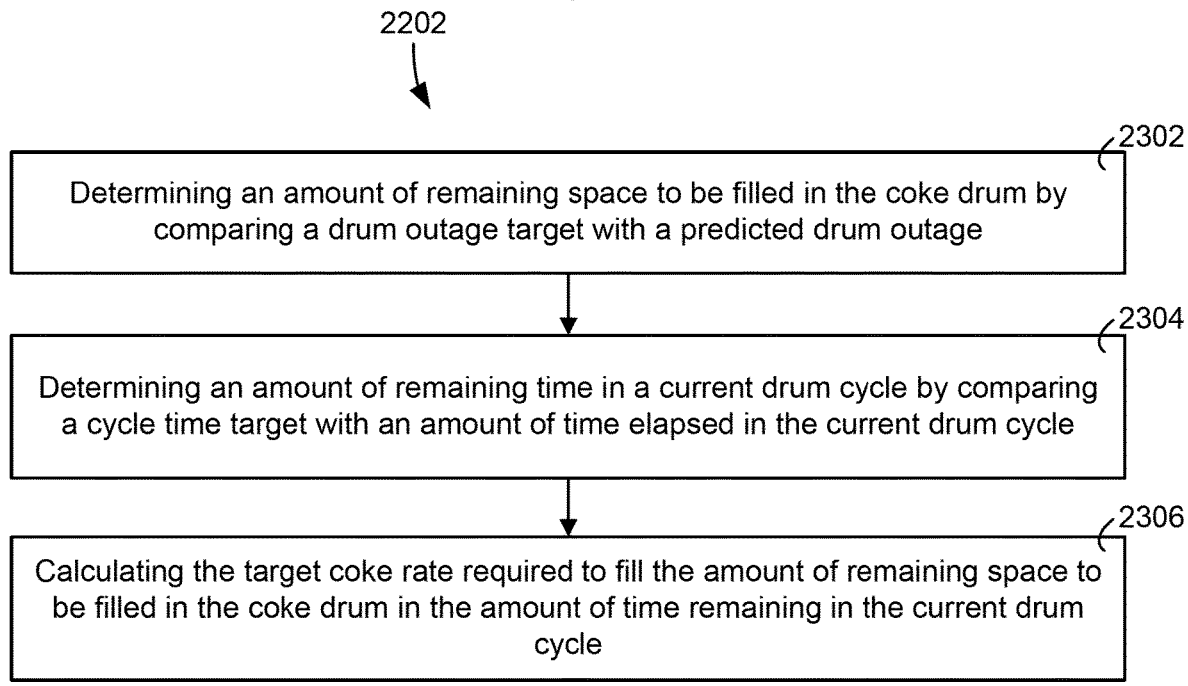
FIG. 23 is a flow diagram of a process for obtaining a target coke rate, which can be performed by the calculator of FIG. 3, according to some embodiments.

Referring now to FIG. 23, a detailed flow diagram of step 2202 is shown, according to some embodiments. FIG. 23 may disclose the method for obtaining a target coke rate. Step 2202 is shown to include determining an amount of remaining space to be filled in the coke drum by comparing a drum outage target with a predicted drum outage (step 2302). In some embodiments, drum outage predictor 222 generates a predicted drum outage and user device 238 provides an outage target to target coke rate calculator 214. Remaining space calculator 302 combines the predicted drum outage and outage target to determine the remaining space in the drum.

Step 2202 is shown to include determining an amount of remaining time in a current drum cycle by comparing a cycle time target with an amount of time elapsed in the current drum cycle (step 2304). In some embodiments, user device 238 provides the cycle time target and drum switch detector 312 provides the time since the last drum switch to remaining time calculator 304 to generate the remaining time in the drum cycle.

Step 2202 is shown to include calculating the target coke rate required to fill the amount of remaining space to be filled in the coke drum in the amount of time remaining in the current drum cycle (step 2306). In some embodiments, rate calculator 306 calculates the target coke rate by processing the remaining space in the drum and the remaining time in the cycle to determine the target coke rate.

Figure 24:
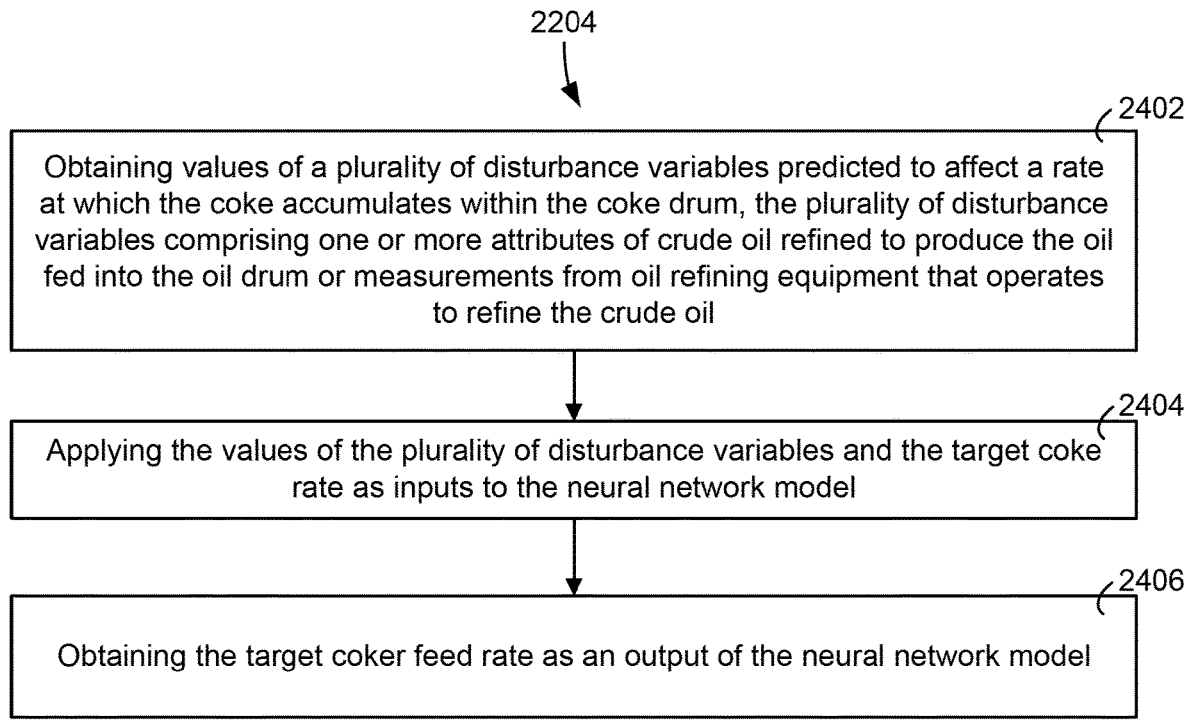
FIG. 24 is a flow diagram of a process for generating a target coker feed rate, which can be performed by the neural network model of FIG. 2, according to some embodiments.

Referring now to FIG. 24, a detailed flow diagram of step 2204 is shown, according to some embodiments. Step 2204 is shown to include obtaining values of a plurality of disturbance variables predicted to affect a rate at which the coke accumulates within the coke drum, the plurality of disturbance variables comprising one or more attributes of crude oil refined to produce the oil fed into the oil drum or measurements from oil refining equipment that operates to refine the crude oil (step 2402). As discussed above, disturbance variable may any variable this is received as an input and used as a factor in controlling the manipulated variables (e.g., furnace feed rate). These disturbance variables (e.g., furnace average coil outlet temperature, vacuum tower stripping steam flow rate, etc.) can affect the coke production inside of the coke drum. As such various DV's are received and processed prior to determining a target coker feed rate.

Step 2204 is shown to include applying the values of the plurality of disturbance variables and the target coke rate as inputs to the neural network model (step 2404). Neural network model 216 can receive the values of the various disturbance variables and use them to determine the target coke rate. In some embodiments, the received DV values are compared with training data from neural network trainer 212 to improve the accuracy of the target coke rate.

Step 2204 is shown to include obtaining the target coker feed rate as an output of the neural network model (step 2406). Neural network model 216 can provide the generated target coker feed rate to coker feed rate controller 218 to adjust the feed rate. In some embodiments, neural network model 216 generates a predicted coke rate based on the target coke rate and measurements/crude attributes received at neural network model 216. Target coker feed rate may be implemented by controlling drum feeder 1412.

Figure 25:
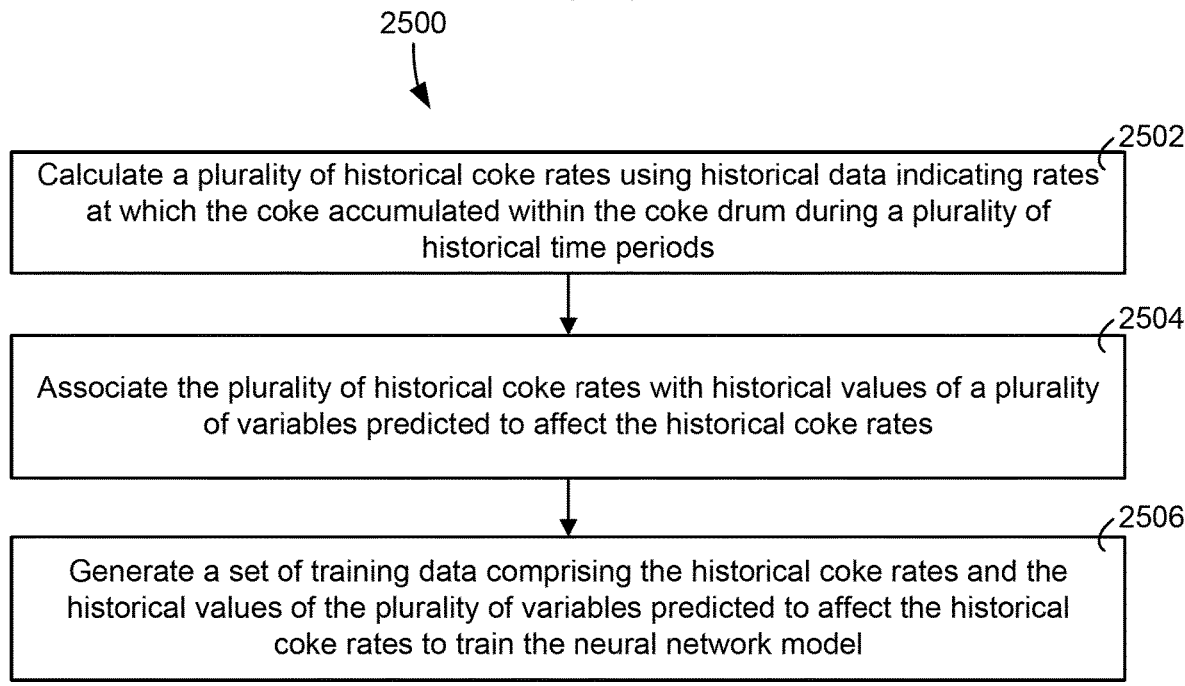
FIG. 25 is a flow diagram of a process for generating training data which can be used by the neural network trainer of FIG. 2, according to some embodiments.

Referring now to FIG. 25, a process 2500 for generating training data for a neural network model is shown, according to some embodiments. In some embodiments, process 2500 is performed by neural network trainer 212. Process 2500 is shown to include calculating a plurality of historical coke rates using historical data indicating rates at which the coke accumulated within the coke drum during a plurality of historical time periods (step 3002). Neural network trainer 212 can receive historical data from database 240. Database 240 may include data relating to or include control variables (e.g., MV's).

Process 2500 is shown to include associating the plurality of historical coke rates with historical values of a plurality of variables predicted to affect the historical coke rates (step 3004). Once the plurality of coke rates have been generated, neural network trainer 212 may associate the rates with historical values (e.g., MV's) such that neural network model 216 can learn previous historical values of MV's and associated historical coke rates.

Process 2500 is shown to include generating a set of training data comprising the historical coke rates and the historical values of the plurality of variables predicted to affect the historical coke rates to train the neural network model (step 2506). In some embodiments, neural network trainer 212 generates a set of training data with the historical coke rates and associated MV values. This data is provided to neural network model 216 for training. Specifically, neural network trainer 212 can adjust the weighting given for the input and black-box layers such that neural network model 216 begins to more accurately predict coke rates. An example of neural network trainer 212 training neural network model 216 is described above with reference to FIGS. 25-26.

As disclosed herein, various systems and methods may be incorporated partially or entirely in to other systems disclosed herein. For example, system 500 as shown in FIG. 5 can be entirely incorporated into system 200 for controlling/monitoring system 100. In another example, process 1100 for adjusting the coke rate of a received predicted coke rate may be implanted entirely by system 200 as shown in FIG. 2. Additionally, various components may be referred to with different references but can perform identically or substantially similarly. For example, drum outage predictor 222 may be identical or substantially similar to drum outage predictor 222.

In some embodiments, drum outage target levels may vary in small or large amounts in relation to outage levels described herein. For example, FIGS. 16, 19, and 20 disclose coke rate information for drums with operator base control outage targets of 12 m Drum outage targets in other embodiments may be less aggressive, and may be as high as 5 m or even higher. The various drum outages disclosed above are shown as exemplary embodiments and should not be limiting to the aforementioned 12 m operator base control outage target levels for coke drums 116, 118. Additionally, various outage levels prior to the outage target (e.g., 12 m 13 m, 14, etc.) at which point source data may be used, are also shown as exemplary and makers/points at other outage levels may be considered.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A control system for automatic operation of a coker, the control system comprising:
   a drum feeder operable to modulate a feed of oil into a coke drum of the coker;
   a controller comprising a processing circuit configured to:
     obtain a target coke rate indicating a target rate at which to accumulate coke within the coke drum;
     use a neural network model to generate a target coker feed rate predicted to result in the coke accumulating within the coke drum at the target coke rate, the target coker feed rate indicating a target rate at which to feed the oil into the coke drum; and
     operate the drum feeder using the target coker feed rate to modulate the feed of oil into the coke drum.

2. The control system of claim 1, wherein the coker is a delayed coker and the feed of oil is residual oil, the delayed coker operable to heat the residual oil to its thermal cracking temperature.

3. The control system of claim 1, wherein the processing circuit is configured to calculate the target coke rate by:
   determining an amount of remaining space to be filled in the coke drum by comparing a drum outage target with a predicted drum outage;
   determining an amount of remaining time in a current drum cycle by comparing a cycle time target with an amount of time elapsed in the current drum cycle; and
   calculating the target coke rate required to fill the amount of remaining space to be filled in the coke drum in the amount of time remaining in the current drum cycle.

4. The control system of claim 1, wherein using the neural network to generate the target coker feed rate comprises:
   obtaining values of a plurality of disturbance variables predicted to affect a rate at which the coke accumulates within the coke drum, the plurality of disturbance variables comprising one or more attributes of crude oil refined to produce the oil fed into the oil drum or measurements from oil refining equipment that operates to refine the crude oil;
   applying the values of the plurality of disturbance variables and the target coke rate as inputs to the neural network model; and
   obtaining the target coker feed rate as an output of the neural network model.

5. The control system of claim 1, wherein the processing circuit is configured to:
   calculate a plurality of historical coke rates using historical data indicating rates at which the coke accumulated within the coke drum during a plurality of historical time periods;
   associate the plurality of historical coke rates with historical values of a plurality of variables predicted to affect the historical coke rates;

generate a set of training data comprising the historical coke rates and the historical values of the plurality of variables predicted to affect the historical coke rates; and train the neural network model using the set of training data.

6. The control system of claim 1, wherein the processing circuit is configured to:

obtain an actual coker feed rate indicating an actual rate at which the oil is fed into the coke drum; and use the neural network model to generate a predicted coke rate predicted to result from feeding the oil into the coke drum at the actual coker feed rate.

7. The control system of claim 6, wherein the processing circuit is configured to:

calculate a coke rate bias by comparing the predicted coke rate with an actual coke rate indicating an actual rate at which the coke accumulates within the coke drum; and apply the coke rate bias to another value of the predicted coke rate to generate an adjusted coke rate.

8. The control system of claim 6, wherein the processing circuit is configured to generate a predicted drum outage based on a size of the coke drum and plurality of values of the predicted coke rate at a plurality of times since the coke began accumulating in the coke drum, the predicted drum outage indicating a predicted amount of available space in the coke drum.

9. The control system of claim 8, wherein the processing circuit is configured to:

calculate an outage bias by comparing the predicted drum outage with an actual drum outage indicating an actual amount of space available within the coke drum; and apply the outage bias to another value of the predicted drum outage to generate an adjusted value of the drum outage.

10. A method for automatic operation of a coker, the method comprising:

obtaining a target coke rate indicating a target rate at which to accumulate coke within a coke drum of the coker;

using a neural network model to generate a target coker feed rate predicted to result in the coke accumulating within the coke drum at the target coke rate, the target coker feed rate indicating a target rate at which to feed oil into the coke drum; and operating a drum feeder using the target coker feed rate to modulate a feed of oil into the coke drum.

11. The method of claim 10, wherein the coker is a delayed coker and the feed of oil is residual oil, the delayed coker operable to heat the residual oil to its thermal cracking temperature.

12. The method of claim 10, wherein calculating the target coke rate comprises:

determining an amount of remaining space to be filled in the coke drum by comparing a drum outage target with a predicted drum outage;

determining an amount of remaining time in a current drum cycle by comparing a cycle time target with an amount of time elapsed in the current drum cycle; and calculating the target coke rate required to fill the amount of remaining space to be filled in the coke drum in the amount of time remaining in the current drum cycle.

13. The method of claim 10, wherein using the neural network to generate the target coker feed rate comprises:

obtaining values of a plurality of disturbance variables predicted to affect a rate at which the coke accumulates within the coke drum, the plurality of disturbance variables comprising one or more attributes of crude oil refined to produce the oil fed into the oil drum or measurements from oil refining equipment that operates to refine the crude oil;

applying the values of the plurality of disturbance variables and the target coke rate as inputs to the neural network model; and obtaining the target coker feed rate as an output of the neural network model.

14. The method of claim 10, further comprising:

calculating a plurality of historical coke rates using historical data indicating rates at which the coke accumulated within the coke drum during a plurality of historical time periods;

associating the plurality of historical coke rates with historical values of a plurality of variables predicted to affect the historical coke rates;

generating a set of training data comprising the historical coke rates and the historical values of the plurality of variables predicted to affect the historical coke rates; and training the neural network model using the set of training data.

15. The method of claim 10, further comprising:

obtaining an actual coker feed rate indicating an actual rate at which the oil is fed into the coke drum; and using the neural network model to generate a predicted coke rate predicted to result from feeding the oil into the coke drum at the actual coker feed rate.

16. The method of claim 15, further comprising:

calculating a coke rate bias by comparing the predicted coke rate with an actual coke rate indicating an actual rate at which the coke accumulates within the coke drum; and applying the coke rate bias to another value of the predicted coke rate to generate an adjusted coke rate.

17. The method of claim 15, further comprising generating a predicted drum outage based on a size of the coke drum and plurality of values of the predicted coke rate at a plurality of times since the coke began accumulating in the coke drum, the predicted drum outage indicating a predicted amount of available space in the coke drum.

18. The method of claim 17, further comprising:

calculating an outage bias by comparing the predicted drum outage with an actual drum outage indicating an actual amount of space available within the coke drum; and applying the outage bias to another value of the predicted drum outage to generate an adjusted value of the drum outage.

19. A control system for automatic operation of a petroleum product refinery, the control system comprising:

a feeder operable to modulate a feed of an input petroleum product into a production unit of the petroleum product refinery, the production unit operable to convert at least a portion of the input petroleum product into a derived petroleum product;

a controller comprising a processing circuit configured to:

obtain a target production rate indicating a target rate at which to produce the derived petroleum product within the production unit;

use a predictive model to generate a target feed rate predicted to result in the derived petroleum product being produced within the production unit at the target production rate, the target feed rate indicating a target rate at which to feed the input petroleum product into the production unit; and operate the feeder using the target feed rate to modulate the feed of the input petroleum product into the production unit.

20. The control system of claim 19, wherein using the predictive model to generate the target feed rate comprises:

obtaining values of a plurality of disturbance variables predicted to affect a rate at which the derived petroleum product is produced within the production unit, the plurality of disturbance variables comprising one or more attributes of a crude petroleum product refined to produce the input petroleum product fed into the production unit or measurements from refining equipment that operates to refine the crude petroleum product;

applying the values of the plurality of disturbance variables and the target production rate as inputs to the predictive model; and obtaining the target feed rate as an output of the predictive model.

21. The control system of claim 19, wherein the processing circuit is configured to:

calculate a plurality of historical production rates using historical data indicating rates at which the derived petroleum product was produced during a plurality of historical time periods;

associate the plurality of historical production rates with historical values of a plurality of variables predicted to affect the historical production rates;

generate a set of training data comprising the historical production rates and the historical values of the plurality of variables predicted to affect the historical production rates; and train the predictive model using the set of training data.

22. The control system of claim 19, wherein the processing circuit is configured to:

obtain an actual feed rate indicating an actual rate at which the input petroleum product is fed into the production unit; and use the predictive model to generate a predicted production rate predicted to result from feeding the input petroleum product into the production unit at the actual feed rate.

23. The control system of claim 19, wherein the predictive model is a neural network model.

* * * * *